United States Patent
Ishi

(10) Patent No.: US 8,998,542 B2
(45) Date of Patent: Apr. 7, 2015

(54) CUTTING INSERT, CUTTING TOOL, AND METHOD OF MANUFACTURING MACHINED PRODUCT USING THEM

(75) Inventor: Hirohisa Ishi, Moriyama (JP)

(73) Assignee: Kyocera Corporation, Kyoto (JP)

(*) Notice: Subject to any disclaimer, the term of this patent is extended or adjusted under 35 U.S.C. 154(b) by 294 days.

(21) Appl. No.: 13/810,735

(22) PCT Filed: Aug. 10, 2011

(86) PCT No.: PCT/JP2011/068220
§ 371 (c)(1),
(2), (4) Date: Jan. 17, 2013

(87) PCT Pub. No.: WO2012/020784
PCT Pub. Date: Feb. 16, 2012

(65) Prior Publication Data
US 2013/0115022 A1 May 9, 2013

(30) Foreign Application Priority Data

Aug. 11, 2010 (JP) ................................. 2010-180159
Dec. 28, 2010 (JP) ................................. 2010-292372
Mar. 31, 2011 (JP) ................................. 2011-077201

(51) Int. Cl.
*B23C 5/02* (2006.01)
*B23C 5/20* (2006.01)
*B23C 5/10* (2006.01)

(52) U.S. Cl.
CPC . *B23C 5/02* (2013.01); *B23C 5/109* (2013.01); *B23C 5/207* (2013.01); *B23C 2200/0494* (2013.01); *B23C 2200/125* (2013.01); *B23C 2200/128* (2013.01)

(58) Field of Classification Search
USPC ...................... 407/33, 42, 113, 114, 115, 116
See application file for complete search history.

(56) References Cited

U.S. PATENT DOCUMENTS 5,207,538 A * 5/1993 Satran ........................... 407/113
6,142,716 A * 11/2000 Jordberg et al. .............. 407/114
(Continued)

FOREIGN PATENT DOCUMENTS

JP      46-026025 B1    7/1971
JP      2008-254129      10/2008
(Continued)

*Primary Examiner* — Will Fridie, Jr.
(74) *Attorney, Agent, or Firm* — Volpe and Koenig, P.C.

(57) ABSTRACT

A cutting insert according to an embodiment of the invention includes: an upper surface; a lower surface; a side surface which is connected to each of the upper surface and the lower surface, and includes a first side surface and a second side surface adjacent to each other; and a cutting edge including a major cutting edge located at an intersection of the upper surface and the first side surface, and a minor cutting edge located at an intersection of the upper surface and the second side surface. The upper surface includes a rake surface which is located along the major cutting edge, and is inclined downward as the upper surface separates from the major cutting edge. The second side surface includes a second upper constraining surface and a second lower constraining surface in order as the second side surface goes from the upper surface to the lower surface. The second upper constraining surface is inclined inward at an inclination angle $\alpha 1$ with reference to a central axis extending between the upper surface and the lower surface. The second lower constraining surface is continuous with the second upper constraining surface, and is inclined outward at an inclination angle $\alpha 2$ with reference to the central axis. A cutting tool with the cutting inserts, and a method of manufacturing a machined product by using the cutting tool are also provided.

23 Claims, 13 Drawing Sheets

(56) References Cited

U.S. PATENT DOCUMENTS

| | | | |
|---|---|---|---|
| 7,040,844 B1 * | 5/2006 | Daiguji | 407/113 |
| 8,043,031 B2 * | 10/2011 | Sung et al. | 407/42 |
| 2007/0003384 A1 | 1/2007 | Smilovici et al. | |
| 2007/0224006 A1 | 9/2007 | Smilovici et al. | |
| 2008/0304924 A1 | 12/2008 | Engstrom et al. | |
| 2011/0170963 A1 * | 7/2011 | Smilovici et al. | 407/42 |

FOREIGN PATENT DOCUMENTS

| | | |
|---|---|---|
| JP | 2008-302493 | 12/2008 |
| JP | 2008-544872 | 12/2008 |
| JP | 2010-105134 | 5/2010 |
| WO | WO 2007-004206 | 1/2007 |

* cited by examiner

CUTTING INSERT, CUTTING TOOL, AND METHOD OF MANUFACTURING MACHINED PRODUCT USING THEM

TECHNICAL FIELD

The present invention relates to a cutting insert, a cutting tool, and a method of manufacturing a machined product using them.

BACKGROUND ART

As an example of cutting inserts, Japanese Unexamined Patent Publication No. 2008-544872 discloses a reversible cut insert having a square shape in a top view. This publication also describes that the cutting insert performs a cutting process of a workpiece by using major edges of major side surfaces, respectively, corresponding to individual sides of the square shape, and auxiliary edges of auxiliary side surfaces formed by cutting out corner parts.

However, the foregoing cutting insert is configured to cut a workpiece surface by using the auxiliary edges of the auxiliary side surfaces having a planar shape, thus causing the problem that it is difficult to ensure a sufficient flank angle between the auxiliary side surfaces and the workpiece surface. Hence, there is a risk that the contact between the auxiliary side surfaces and the workpiece surface will deteriorate surface finish of the workpiece surface, and the auxiliary side surfaces will wear out, failing to exhibit a desired function when the cutting insert is used in a reversible manner.

On the other hand, in order to reduce the contact between the auxiliary side surfaces and the workpiece surface, it is necessary to decrease an axial rake angle of the major edges of the major side surface when the cutting insert is attached to a holder. Thus, there is a risk that the cutting resistance exerted on the major edges will be increased. There is also a concern that the cutting insert will be lifted up from the holder in a predetermined direction by a cutting force exerted on the cutting insert when the workpiece surface is cut by the auxiliary edges of the auxiliary side surfaces.

SUMMARY OF THE INVENTION

An object of the present invention is to provide a cutting insert and a cutting tool which achieve both cutting resistance reduction and long life, and a method of manufacturing a machined product using the cutting insert and the cutting tool.

A cutting insert according to an embodiment of the present invention includes: an upper surface; a lower surface; a side surface which is connected to each of the upper surface and the lower surface, and includes a first side surface and a second side surface adjacent to each other; and a cutting edge including a major cutting edge located at an intersection of the upper surface and the first side surface, and a minor cutting edge located at an intersection of the upper surface and the second side surface. The upper surface includes a rake surface which is located along the major cutting edge and is inclined downward as the upper surface separates from the major cutting edge. The second side surface includes a second upper constraining surface and a second lower constraining surface in order as the second side surface goes from the upper surface to the lower surface. The second upper constraining surface is inclined inward at an inclination angle α1. The second lower constraining surface is continuous with the second upper constraining surface and is inclined outward at an inclination angle α2 with reference to a central axis extending between the upper surface and the lower surface.

A cutting tool according to an embodiment of the present invention includes the foregoing cutting insert, and a holder configured to attach the cutting insert thereto. The holder includes a seating surface configured to contact the lower surface of the cutting insert, and a first constraining surface configured to contact the first upper constraining surface of the cutting insert. An angle formed by a virtual extension line of the seating surface and a virtual extension line of the first constraining surface is an acute angle.

A method of manufacturing a machined product according to an embodiment of the present invention includes rotating the foregoing cutting tool; bringing the cutting edge of the cutting tool being rotated into contact against a workpiece; and separating the cutting tool from the workpiece.

In the cutting insert according to the embodiment of the present invention, the second side surface includes the second upper constraining surface and the second lower constraining surface in order as the second side surface goes from the upper surface to the lower surface. The second upper constraining surface is inclined inward at an inclination angle α1. The second lower constraining surface is continuous with the second upper constraining surface and is inclined outward at an inclination angle α2 with reference to the central axis extending between the upper surface and the lower surface. Therefore, a relatively large flank angle between the second surface and a machined surface of the workpiece can be ensured without allowing the cutting insert to incline forward in a travel direction of a rotation direction of the holder when the cutting insert is attached to the holder. In other words, a relatively large axial rake angle of the major cutting edge can be ensured without allowing the cutting insert to incline forward. This allows for setting a relatively small inclination of the major cutting edge in a side view of the cutting insert, consequently producing an advantage that there is no need to excessively increase the thickness of the cutting inert.

BRIEF DESCRIPTION OF THE DRAWINGS

FIG. 9(*b*) is an enlarged sectional view thereof taken along the line A-A in FIG. 9(*a*); FIG. 9(*c*) is an enlarged sectional view taken along the line B-B in FIG. 9(*a*); FIG. 9(*d*) is an enlarged sectional view taken along the line C-C in FIG. 9(*a*); FIG. 9(*e*) is an enlarged sectional view taken along the line D-D in FIG. 9(*a*);

FIG. 10(*b*) is a side view thereof taken from a different angle from that in FIG. 10(*a*), namely, a side view obtained by rotating FIG. 10(*a*) 90 degrees, that is, a side view when FIG. 10(*a*) is viewed from below; FIG. 10(*c*) is a front end view thereof;

FIG. 11(*b*) is a side view thereof;

FIG. 12(*b*) is a front end view of FIG. 12(*a*)

PREFERRED EMBODIMENTS FOR CARRYING OUT THE INVENTION

Figure 1A:
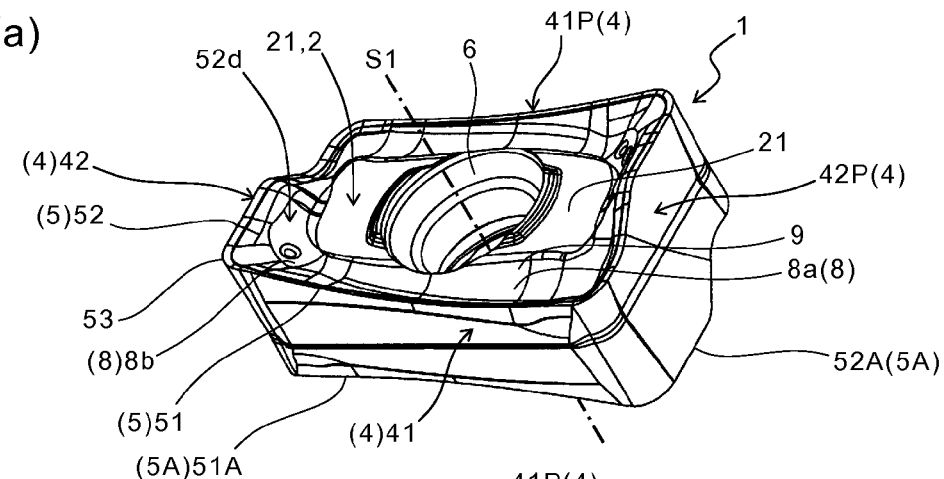
FIG. 1(a) is a perspective view showing a cutting insert according to a first embodiment of the present invention.

<Cutting Insert>
(First Embodiment)

A first embodiment of the cutting insert (hereinafter referred to as "insert" in some cases) according to the present invention is described in details below with reference to FIGS. 1 to 3.

As shown in FIG. 1, the insert 1 of the present embodiment generally includes an upper surface 2, a lower surface 3, a side surface 4 connected to each of the upper surface 2 and the lower surface 3, a through hole 6 extending between the upper surface 2 and the lower surface 3, and a cutting edge 5 located at an intersection of the upper surface 2 and the side surface 4. The upper surface 2 includes a rake surface 8, a raised surface 9 and a flat surface 21. The side surface 4 includes a first side surface 41 and a second side surface 42 adjacent to each other. The cutting edge 5 includes a major cutting edge 51 and a minor cutting edge 52. The individual elements of the insert 1 are described sequentially below.

As shown in FIG. 1(*b*), the insert 1 is in a substantially quadrangular shape (substantially rectangular shape) in a top view. Here at, the phrase "top view" denotes a state in which the insert 1 is viewed from the upper surface 2 unless otherwise stated. The shape of the insert 1 is not limited to the substantially quadrangular shape. The insert 1 may be shaped like a plate having a substantially polygonal shape, such as triangle, pentagon, hexagon, or octagon, in a top view.

In the insert 1, for example, the long sides of the substantially quadrangular shape are preferably about 8 to 15 mm, and the short sides thereof are preferably about 4 to 8 mm in a top view. A thickness from the upper surface 2 to the lower surface 3 is preferably about 3 to 7 mm. The term "thickness" denotes a line segment parallel to a central axis S1 of the insert 1 in a distance between a region of the upper surface 2 located uppermost and a region of the lower surface 3 located lowermost in a side view. The phrase "central axis S1 of the inert 1" denotes an axis which extends between the upper surface 2 and the lower surface 3, and serves as a rotation axis when the insert 1 is rotated in a top view.

Similarly to the upper surface 2, the insert 1 also includes a cutting edge 5A having a major cutting edge 51A and a minor cutting edge 52A at an intersection of the lower surface 3 and the side surface 4, as shown in FIG. 1(*a*). When the cutting process is performed using the major cutting edge 51A closer to the lower surface 3, the flat surface 21 of the upper surface 2 is usable as a seating surface with respect to a holder 10 described later. That is, the insert 1 of the present embodiment allows each of the upper surface 2 and the lower surface 3 to be used for the cutting process. Therefore, the major cutting edge 51A closer to the lower surface 3 has a shape obtained by reversing the major cutting edge 51 closer to the upper surface 2 so as to permit use of the insert 1 in a state in which the top and bottom of the insert 1 are reversed.

That is, the insert 1 has rotational symmetry around a line perpendicular to the paper surface of FIG. 1(*c*). Hence, the insert 1 of the present embodiment can perform the cutting process using a total of four corners, two on each of the upper surface 2 and the lower surface 3. Thus, the region for forming the major cutting edge 51 and the region for forming the minor cutting edge 52 in the side surface 4 are configured separately as the first side surface 41 and the second side surface 42. It is therefore relatively easy to design the major cutting edge 51 and both the rake surface 8 and the raised surface 9 which are located along the major cutting edge 51 on the upper surface 2, and a flank surface (second upper constraining surface 42*a*) with respect to the minor cutting edge 52, as an independent suitable element.

The cutting edge 5 is located at the intersection of the upper surface 2 and the side surface 4, and includes the major cutting edge 51 and the minor cutting edge 52 as described above. In the present embodiment, the major cutting edge 51 and the minor cutting edge 52 are connected to each other with a corner cutting edge 53 interposed therebetween, as shown in FIG. 1(*b*). The insert 1 of the present embodiment can perform the cutting process using the major cutting edge 51, the minor cutting edge 52, and the corners including the corner cutting edge 53.

The major cutting edge 51 is located at an intersection of the upper surface 2 and the first side surface 41, and performs a major role in chip generation during a cutting action. The major cutting edge 51 has a gentle outward convex-shaped curve as the major cutting edge 51 separates from the minor cutting edge 52 in a top view, as shown in FIG. 1(*b*). The major cutting edge 51 is also inclined downward as the major cutting edge 51 separates from the minor cutting edge 52 in a side view, as shown in FIG. 1(*d*). The former structure allows for a reduction in the edge fracture of the major cutting edge 51, and the latter structure allows for a reduction of cutting resistance during the cutting process. The inclination angle of the major cutting edge 51 in a side view is gradually decreased as the major cutting edge 51 separates from the minor cutting edge 52. An end portion of the major cutting edge 51 which is the remotest from the minor cutting edge 52 may have zero inclination angle in a side view.

The minor cutting edge 52 is located at an intersection of the upper surface 2 and the second side surface 42, and has a role in smoothing a machined surface 102 of a workpiece 100 described later. In the present embodiment, a region of the intersection of the upper surface 2 and the second side surface 42 which extends from the end portion of the intersection located closer to the major cutting edge 51 (corner cutting edge 53) to a middle part thereof is preferably mainly used during the cutting process. Also in the present embodiment, the minor cutting edge 52 is in a straight-like line in a side view taken from the second side surface 42, as shown in FIG. 1(c), and is also in a straight-like line in a top view, as shown in FIG. 1(b).

Figure 1B:
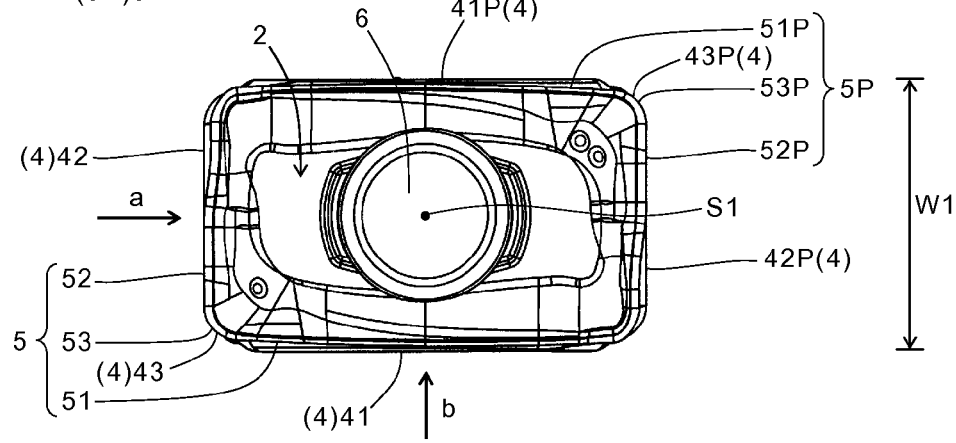
FIG. 1(b) is a plan view (top view) thereof.
Figure 1C:
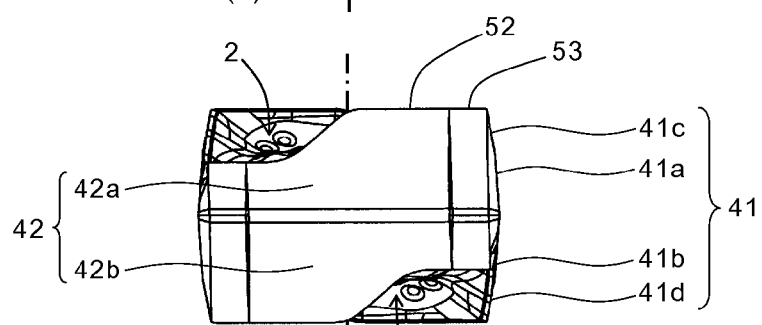
FIG. 1(c) is a side view thereof (the side closer to a second side surface) taken from a direction of arrow a in FIG. 1(b)
Figure 1D:
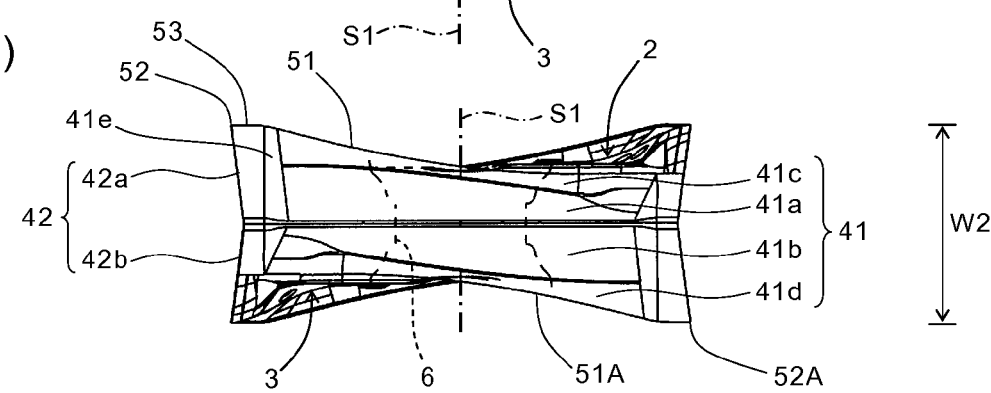
FIG. 1(d) is a side view thereof (the side closer to a first side surface) taken from a direction of arrow b in FIG. 1(b)

The corner cutting edge 53 is disposed between the major cutting edge 51 and the minor cutting edge 52, and is in a relatively gentle curve shape, as shown in FIG. 1(b). The corner cutting edge 53 has a role in reducing fracture at the intersection of the major cutting edge 51 and the minor cutting edge 52.

On the other hand, as shown in FIG. 1(a), the upper surface 2 includes the rake surface 8 located along the major cutting edge 51 and inclined downward as the upper surface 2 separates from the major cutting edge 51. The upper surface 2 also includes the flat surface 21 in a region of the upper surface 2 which is located at an area surrounding the central axis S1 (through hole 6), and is spaced apart from the major cutting edge 51. The flat surface 21 is perpendicular to the central axis S1, and is located at least partially above the major cutting edge 51 in a side view. In the following, the phrase "side view" denotes a state in which the insert 1 is viewed toward the first side surface 41 unless otherwise stated.

The rake surface 8 has a role in smoothly discharging the chips generated by the major cutting edge 51 during the cutting process to the exterior by contacting the chips to cause deformation of the chips or change their flow direction. The rake surface 8 may be continuous with the major cutting edge 51, or may be disposed via a so-called land. Alternatively, the rake surface 8 may include a portion of a planar shape or curved surface shape. The concept of "the planar shape" includes not only a flat surface in a strict sense, but also slight irregularities and curves as long as the rake surface 8 can perform its own function. This is also true for the curved surface shape.

The flat surface 21 is the region that functions as a seating surface when the insert 1 is attached to the holder 10. In the present embodiment, the upper surface 2 includes the raised surface 9 which is located continuously with at least a part of the rake surface 8, and is inclined upward as the upper surface 2 separates from the major cutting edge 51, as shown in FIG. 1(a). A first end portion 8a of the rake surface 8 located further away from the minor cutting edge 52 is continuous with the flat surface 21 with the raised surface 9 interposed therebetween. A second end portion 8b of the rake surface 8 located closer to the minor cutting edge 52 is continuous with the flat surface 21.

Alternatively, a flat bottom may be disposed between the rake surface 8 and the raised surface 9. In the present embodiment, an upward inclined region, such as the raised surface 9, is absent in an inner region 52d of the minor cutting edge 52 in the upper surface 2, and a region corresponding to the rake surface 8 and the flat surface 21 are continuous with each other.

The through hole 6 is provided for inserting a fastening screw and an attachment bolt when the insert 1 is attached to the holder 10. The through hole 6 is located at a middle part of the upper surface 2. The central axis of the through hole 6 and the central axis S1 of the insert 1 are located at the same position. In the present embodiment, the upper surface 2 and the lower surface 3 have the same configuration, and therefore, the description of the lower surface 3 is omitted in the following unless a special explanation is required.

The side surface 4 is connected to each of the upper surface 2 and the lower surface 3, and includes the first side surface 41 and the second side surface 42 adjacent to each other, as described above. The first side surface 41 and the second side surface 42 include a plurality of constraining surfaces described later. These individual constraining surfaces exhibit their function as an attachment surface with respect to the holder 10, or their function as a so-called flank surface to avoid contact with the workpiece 100, depending on an attachment direction with respect to the holder 10. In the present embodiment, the side surface 4 further includes a corner side surface 43 which is interposed between the first side surface 41 and the second side surface 42, and is bent outward in a top view.

The insert 1 of the present embodiment has a rectangular shape whose long sides correspond to an outer edge of the first side surface 41 and whose short sides correspond to an outer edge of the second side surface 42 in a top view. Therefore, a third side surface 41P forming a pair with the first side surface 41 is located on the opposite side, and a fourth side surface 42p forming a pair with the second side surface 42 is located on the opposite side. The third side surface 41P and the fourth side surface 42P have the same structure as the first side surface 41 and the second side surface 42, respectively. For the sake of simplicity, only the first side surface 41 and the second side surface 42 are described below, and the descriptions of the third and fourth side surfaces 41P and 42P are omitted unless a special explanation is required. This is also true for other corner side surface 43P configured to pair with the corner side surface 43.

In the insert 1 of the present embodiment, a distance (width) W1 from the first side surface 41 to the third side surface 41P in a top view is larger than a distance (thickness) W2 from the upper surface 2 to the lower surface 3 in a side view. That is, the insert 1 of the present embodiment is the so-called lateral insert 1. The insert 1 is attached to the holder 10 by using a fastening screw 61 configured to be inserted into the through hole 6, as described later. Thus, the insert 1 with a large width allows the rake surface 8 and the raised surface 9 to have desired dimension and shape, thereby improving chip discharge performance. Additionally, the fastening screw 61 is inserted into the through hole 6, thus eliminating the need to increase the thickness of the insert 1 than necessary, resulting in lower material costs.

Figure 2A:
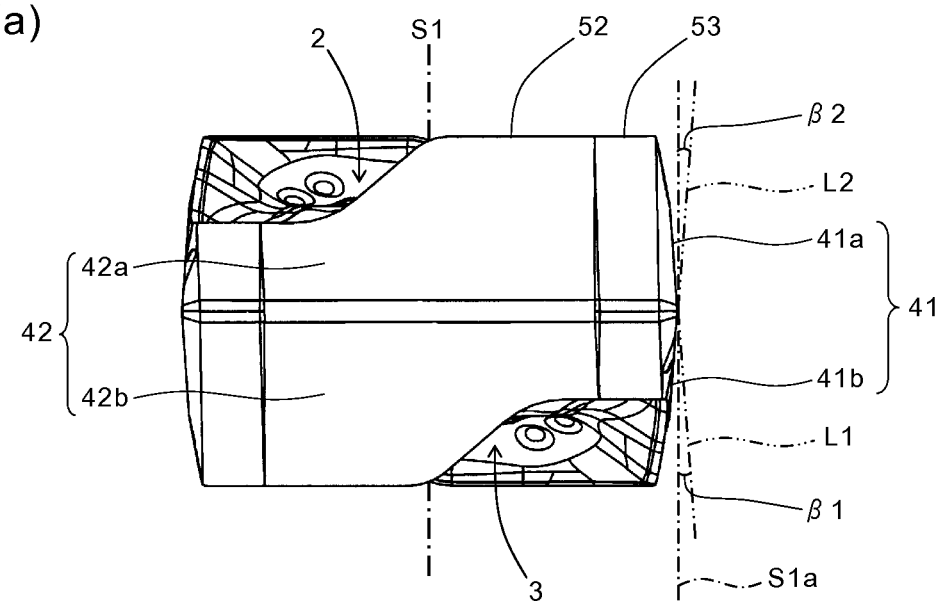
FIGS. 2(a) and 2(b) are respectively enlarged views of FIG. 1(c)
Figure 3:
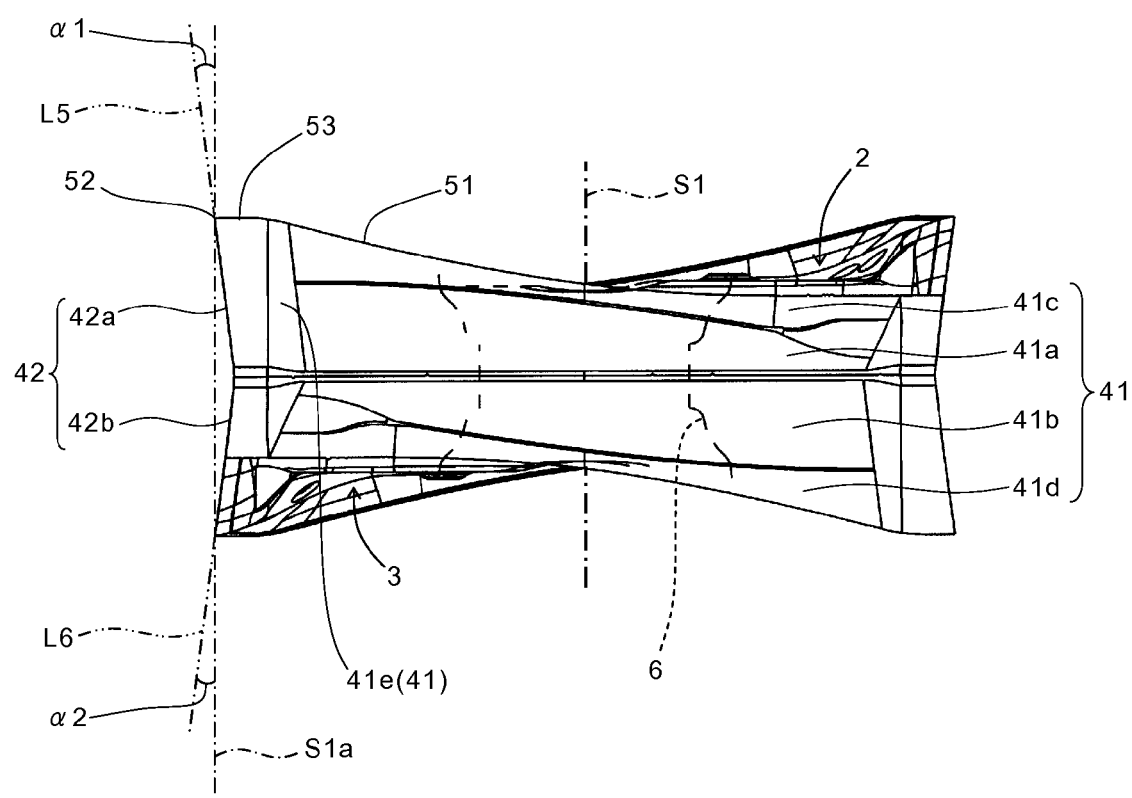
FIG. 3 is an enlarged view of FIG. 1(d)

As shown in FIGS. 2(a) and 3, the first side surface 41 includes a first upper constraining surface 41a and a first lower constraining surface 41b in order as the first side surface 41 goes from the upper surface 2 to the lower surface 3. The first upper constraining surface 41a is inclined outward at an inclination angle $\beta1$ with reference to the central axis S1. The first lower constraining surface 41b is continuous with the first upper constraining surface 41a, and is inclined inward at an inclination angle $\beta2$ with reference to the central axis S1.

Figure 2B:
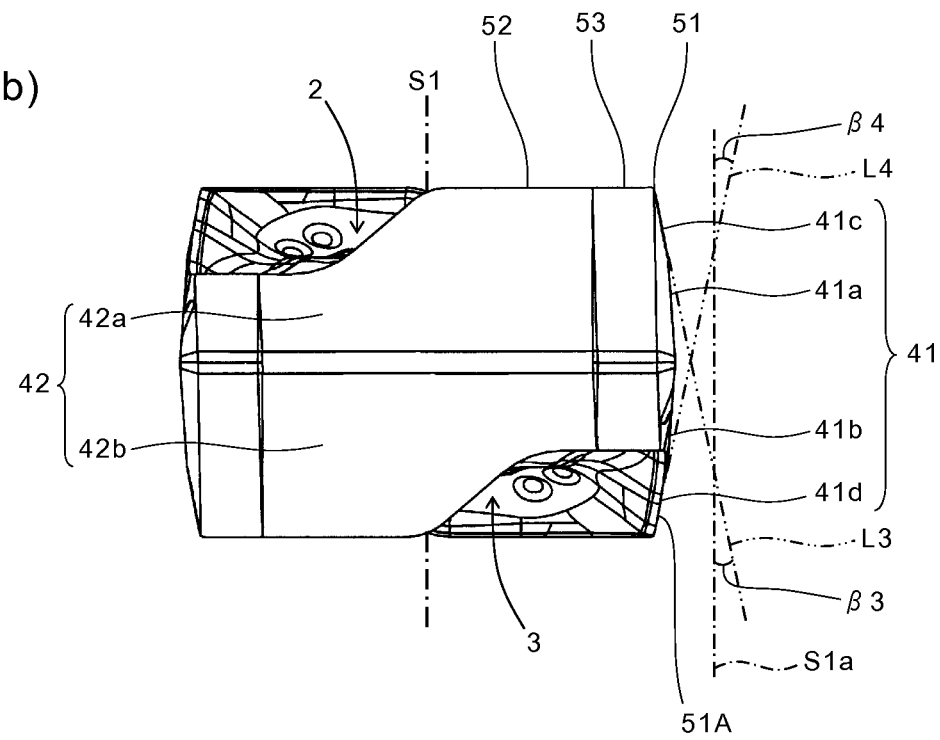

As shown in FIGS. 2(b) and 3, the first side surface 41 further includes a first upper reinforcement surface 41c which is located between the major cutting edge 51 and the first upper constraining surface 41a, and has a region inclined outward at an inclination angle $\beta3$ with reference to the central axis S1 as the first side surface 41 goes from the upper surface 2 to the lower surface 3. The inclination angle $\beta3$ of the first upper reinforcement surface 41c is larger than the inclination angle $\beta1$ of the first upper constraining surface 41a.

Similarly, the first side surface 41 further includes a first lower reinforcement surface 41d which is located between the major cutting edge 51A closer to the lower surface 3 and the first lower constraining surface 41b, and is inclined inward at an inclination angle $\beta4$ with reference to the central axis S1 as the first side surface 41 goes from the upper surface 2 to the lower surface 3. The inclination angle $\beta4$ of the first lower reinforcement surface 41d is larger than the inclination angle $\beta2$ of the first lower constraining surface 41b.

Here, the inclination angle β1 denotes an angle formed by a plane S1a parallel to the central axis S1 and a virtual extension line L1 of the first upper constraining surface 41a. The inclination angle β2 denotes an angle formed by the plane S1a and a virtual extension line L2 of the first lower constraining surface 41b. The inclination angle β3 denotes an angle formed by the plane S1a and a virtual extension line L3 of the first upper reinforcement surface 41c. The inclination angle β4 denotes an angle formed by the plane S1a and a virtual extension line L4 of the first lower reinforcement surface 41d. These individual inclination angles are indicated by an absolute value with reference to the central axis S1.

The insert 1 of the present embodiment has a relationship between the inclination angle β1 and the inclination angle β2, which is given as β1=β2; and a relationship between the inclination angle β3 and the inclination angle β4, which is given as β3=β4. For example, the inclination angles β1 and β2 are preferably set at 3 to 5 degrees, and the inclination angles β3 and β4 are preferably respectively set at 4 to 7 degrees. These individual inclination angles may be changed as they separate from the minor cutting edge 52.

The first side surface 41 further includes a first flank surface 41e which is continuous with the major cutting edge 51, and is located closer to the second side surface 42 than both the first upper reinforcement surface 41c and the first upper constraining surface 41a, and is inclined outward at an inclination angle γ with reference to the central axis S1 as the first side surface 41 goes from the upper surface 2 to the lower surface 3. The inclination angle γ (not shown) of the first flank surface 41e is smaller than the inclination angle β3 of the first upper reinforcement surface 41c. The contact between the insert 1 and a region of the workpiece 100 which becomes a wall surface 101 of the workpiece 100 during the cutting process can be reduced by including the first flank surface 41e. This achieves improved machining accuracy and a reduction of damage to the insert 1. The inclination angle γ of the first flank surface 41e is 3 to 15 degrees less than the inclination angle β1 of the first upper constraining surface 41a.

In the present embodiment, as shown in FIG. 3, the first flank surface 41e is continuous not only with the major cutting edge 51, but also with the corner cutting edge 53. This produces a similar effect on the side of the corner cutting edge 53. When the cutting process is performed using the major cutting edge 51P located closer to the third side surface 41P, the first upper constraining surface 41a of the first side surface 41 is contacted with the holder 10, thus functioning to fix the insert 1 and the holder 10 and vice versa.

The second side surface 42 includes a second upper constraining surface 42a and a second lower constraining surface 42 in order as the second side surface 42 goes from the upper surface 2 to the lower surface 3. The second upper constraining surface 42a is inclined inward at an inclination angle α1 with reference to the central axis S1. The second lower constraining surface 42b is continuous with the second upper constraining surface 42a, and is inclined outward at an inclination angle α2 with reference to the central axis S1. The inclination angle α1 denotes an angle formed by the plane S1a parallel to the central axis 1, and a virtual extension line L5 of the second upper constraining surface 42a. The inclination angle α2 denotes an angle formed by the plane S1a and a virtual extension line L6 of the second lower constraining surface 42b.

The insert 1 of the present embodiment has a relationship between the inclination angle α1 and the inclination angle α2, which is given as α1=α2. For example, the inclination angles α1 and α2 are preferably respectively set at 4 to 8 degrees.

When the cutting process is performed using the minor cutting edge 52P located closer to the fourth side surface 42P, the second lower constraining surface 42b of the second side surface 42 is contacted with the holder 10, thus functioning to fix the insert 1 and the holder 10 and vice versa. A corner cutting edge 53P is located between the minor cutting edge 52P and the major cutting edge 51P.

The insert 1 having the foregoing configuration can be made from a hard material, such as cemented carbide, ceramics or cermet, or, alternatively those in which a hard film of TiC, TiN, TiCN, or $Al_2O_3$ is coated on each of these base materials by means of PVD or CVD. PVD-coated cemented carbide is preferable from the viewpoint of chipping resistance and stability of the coating layer.

(Second Embodiment)

An insert according to a second embodiment of the present invention is described in details below with reference to FIGS. 4 to 7. In FIGS. 4 to 7, elements similar to those in FIGS. 1 to 3 are identified by the same reference numerals, and their respective descriptions are omitted.

Similarly to the insert 1 of the first embodiment, a major cutting edge 51 and a minor cutting edge 52 of a cutting edge 5 in the insert 1A of the present embodiment are connected to each other with a corner cutting edge 53 interposed therebetween, as shown in FIG. 4.

Figure 7A:
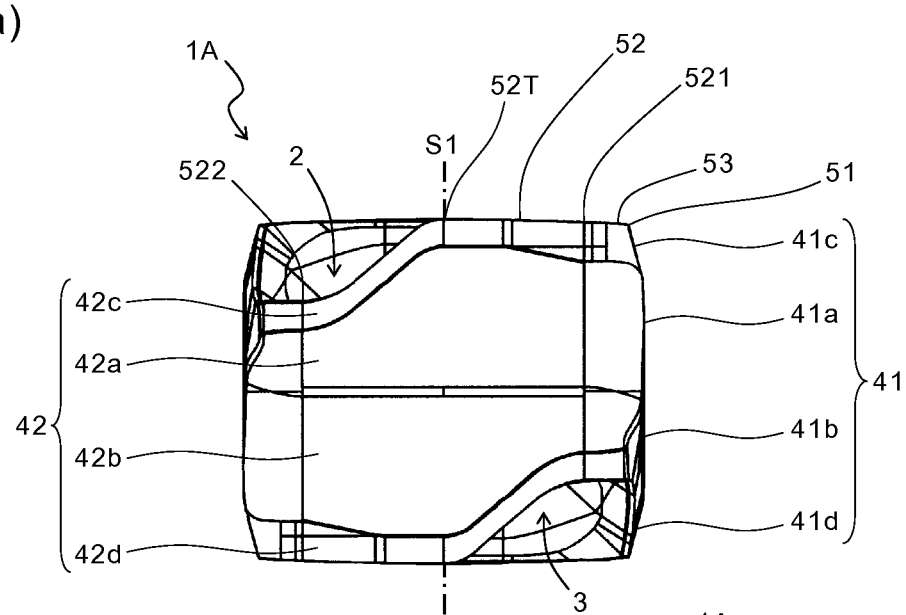
FIG. 7(a) is an enlarged view of FIG. 4(c)

In the present embodiment, as shown in FIG. 7(a), the minor cutting edge 52 has a top point 52T (top) that is the highest in a middle region thereof in a side view from a second side surface 42. The minor cutting edge 52 is inclined downward as it goes from the top point 52T to one end 521 thereof located closer to the major cutting edge 51 (corner cutting edge 53), and to the other end 522 thereof away from the major cutting edge 51 (corner cutting edge 53). An inclination angle in a region from the top point 52T to the one end 521 is smaller than an inclination angle in a region from the top point 52T to the other end 522. The inclinations in these two regions are in a curved shape or arc-like shape. In particular, the region from the top point 52T to the one end 521 has a major role in smoothing a machined surface 102 of a workpiece 100, and is in a gently arc-like shape protruding toward the upper surface 2 as the minor cutting edge 52 goes from the top point 52T to the one end 521.

Figure 7B:
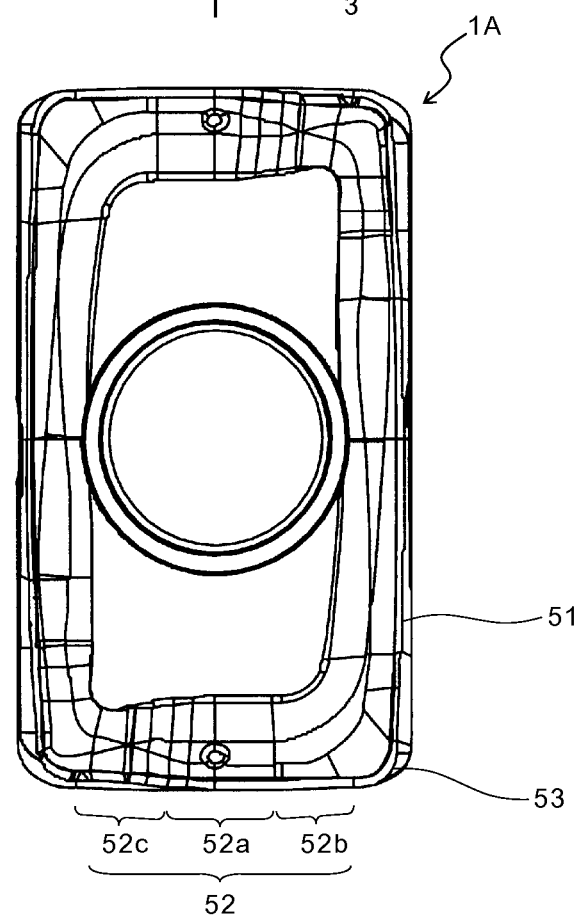
FIG. 7(b) is an enlarged view of FIG. 4(b)

In the present embodiment, the minor cutting edge 52 is made up of three portions 52a, 52b and 52c, each having a straight-like line in a top view, as shown in FIG. 7(b). Specifically, the straight-like lined first portion 52a in a middle region of the minor cutting edge 52 is located most outward of the insert 1, and the straight-like lined second and third portions 52b and 52c located respectively on both sides of the first portion 52a are inclined inward as they separate from the middle region.

When the insert 1A is attached to the holder 10 in such a way that the second portion 52b located closer to the major cutting edge 51 (corner cutting edge 53) goes along a machined surface 102 of a workpiece 100, and that an upper surface 2 is oriented forward in a rotation direction, the foregoing configuration ensures a large clearance between the third portion 52c away from the major cutting edge 51 (corner cutting edge 53) on the upper surface 2 and the machined surface 102 of the workpiece 100, and also ensures a large clearance between the second portion of the minor cutting edge 52A and the corner cutting edge located closer to a lower surface 3, which are configured correspondingly to the upper surface 2, and the machined surface 102 of the workpiece 100. Consequently, the contact between these individual portions and the machined surface 102 of the workpiece 100 can be reduced to enhance the surface accuracy of the machined surface 102 of the workpiece 100.

Instead of the foregoing configuration of the minor cutting edge 52, the first portion 52a and the third portion 52c may be configured to form a continuous straight line in a top view. Instead of forming the minor cutting edge 52 with the foregoing straight-like lined portions, the minor cutting edge 52 may be in such a curved shape that bulges outward of the insert 1 as the minor cutting edge 52 goes from both ends thereof to the middle region thereof.

Similarly to the first embodiment, a side surface 4 is connected to each of the upper surface 2 and the lower surface 3, and includes a first side surface 41 and a second side surface 42 adjacent to each other.

Similarly to the first embodiment, the first side surface 41 includes a first upper constraining surface 41a and a first lower constraining surface 41b, and has a relationship between an inclination angle β1 and an inclination angle β2, which is given as β1=β2. For example, the inclination angles β1 and β2 are preferably respectively set at 3 to 5 degrees.

Figure 4A:
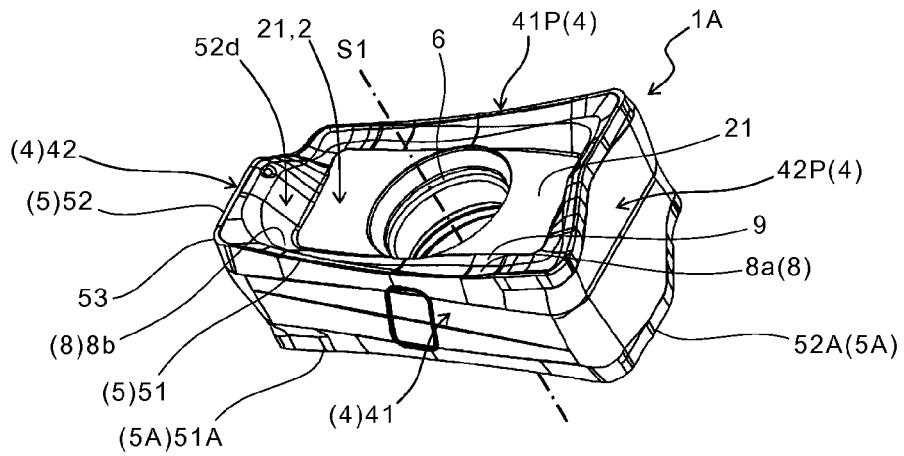
FIG. 4(a) is a perspective view showing a cutting tool according to a second embodiment of the present invention.
Figure 4B:
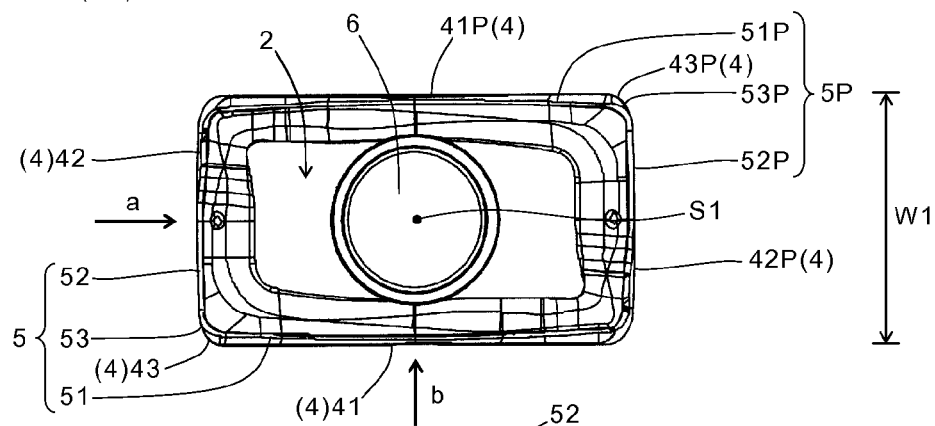
FIG. 4(b) is a plan view (top view) thereof.
Figure 4C:
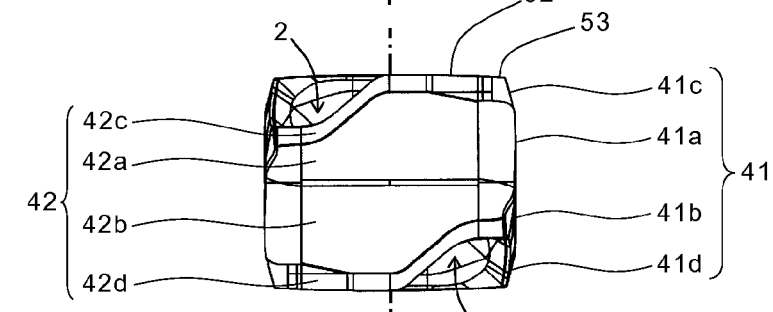
FIG. 4(c) is a side view thereof (the side closer to a second side surface)
Figure 4D:
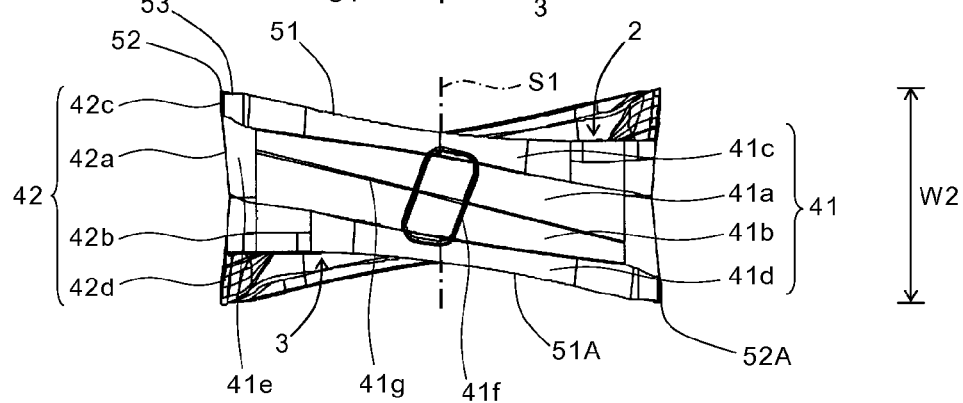
FIG. 4(d) is a side view thereof (the side closer to a first side surface)
Figure 5A:
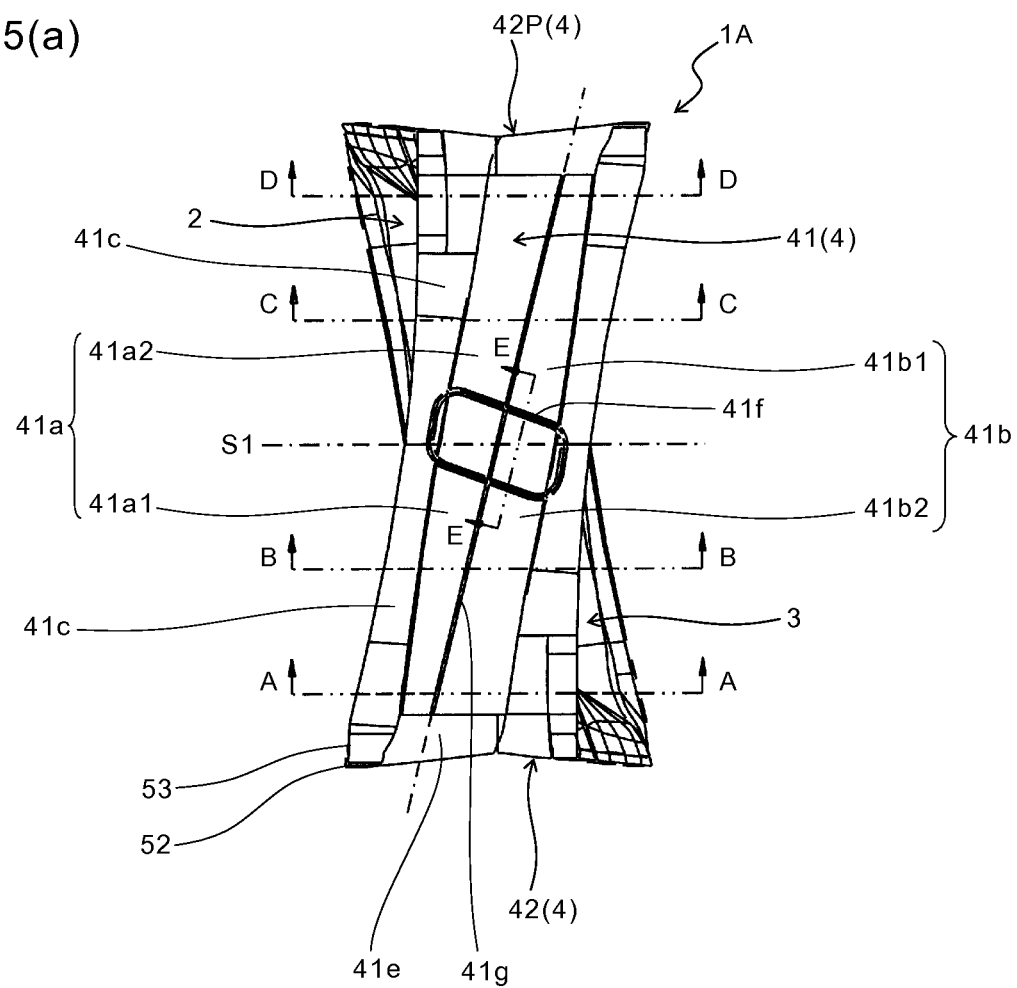
FIG. 5(a) is an enlarged view of FIG. 4(d)

In the insert 1A of the present embodiment, as shown in FIGS. 4(d) and 5(a), a boundary part 41g between the first upper constraining surface 41a and the first lower constraining surface 41b is in a straight-like line, and is inclined toward the lower surface 3 as the boundary part 41g separates from the minor cutting edge 52 with respect to a perpendicular line of a central axis S1 of the insert 1 in a side view. The boundary part 41g is located outermost in the first side surface 41. The boundary part 41g is strictly in a band shape having a narrow width in a thickness direction of the insert 1A, and is in a curved shape that protrudes outward as the boundary part 41g goes from one end to the other end in a width direction of the insert 1A. This allows for smooth loading of a material into a die while ensuring relatively large areas of the first upper constraining surface 41a and the first lower constraining surface 41b. As another example, the boundary part 41g may be in a partially curved shape, or in a curved shape over its entire length in a side view.

In the present embodiment, as shown in FIGS. 4(d) and 5(a), the first side surface 41 includes a constituent portion 41a1 (first upper constraining portion) and a constituent portion 41a2 (second upper constraining portion), and a constituent portion 41b1 (first lower constraining portion) and a constituent portion 41b2 (second lower constraining portion), which are obtained by dividing each of the first upper constraining surface 41a and the first lower constraining surface 41b into two by a concave part 41f. Thus, when the insert 1A is attached to the holder 10, these two pairs of surfaces (regions) 41a1 and 41a2, and 41b1 and 41b2 are independently contacted with the holder 10 with the concave part 41f interposed therebetween. Hence, if slight displacement occurs when the insert 1A is attached to the holder 10, a relatively large contact area with the holder 10 can be ensured to improve attachment stability with respect to the holder 10, than in the case of being contacted with a single surface. Particularly, in the present embodiment, the three surfaces (41a1, 41a2 and 42a) including the second upper constraining surface 42a (or the second lower constraining surface 42b) of the second side surface 42 can be brought into contact with the holder 10, thereby producing excellent attachment stability.

The concave part 41f is preferably inclined in a direction in which the concave part 41f comes closer to the minor cutting edge 52 as the concave part 41f goes from the upper surface 2 to the lower surface 3. This allows the areas of the two divided constraining surfaces 41a1 and 41a2 (41b1 and 41b2) to approach each other. Consequently, a cutting force exerted mainly on the insert 1A during the cutting of the workpiece 100 can be received in a well-balanced manner by the two divided constraining surfaces 41a1 and 41a2 (41b1 and 41b2), thereby improving the attachment stability. A depth 41f1 of the concave part 41f is preferably set at, for example, 0.03 to 0.15 mm.

Figure 5B:
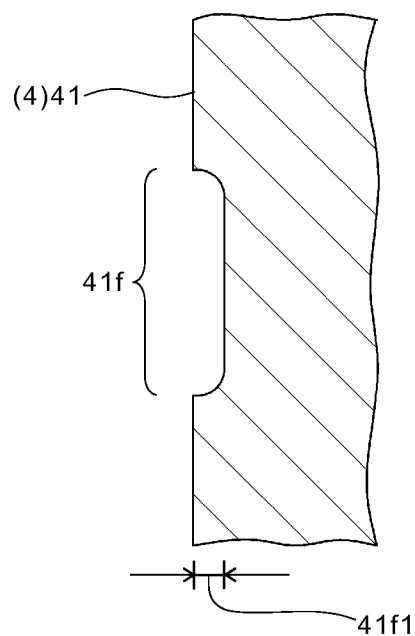
FIG. 5(b) is an enlarged sectional view taken along the line E-E in FIG. 5(a)

In the present embodiment, the first upper reinforcement surface 41c of the first side surface 41 further includes an upper region 41c1 being continuous with the major cutting edge 51, as shown in FIGS. 5 and 6. The upper region 41c1 includes a first region located closer to the minor cutting edge 52 (corner cutting edge 53), and a second region located further away from the minor cutting edge 52 (corner cutting edge 53) in a side view. The first region is inclined outward, and the second region is inclined inward as the upper region 41c1 goes toward the lower surface 3 in a side view. In FIG. 5, a region from the vicinity of the line A-A to the vicinity of the line C-C corresponds to the first region, and a region in the vicinity of the line D-D corresponds to the second region. In FIG. 6, a straight line S1b is perpendicular to the central axis S1, and passes through the center in a thickness direction of the insert 1.

Figure 6A:
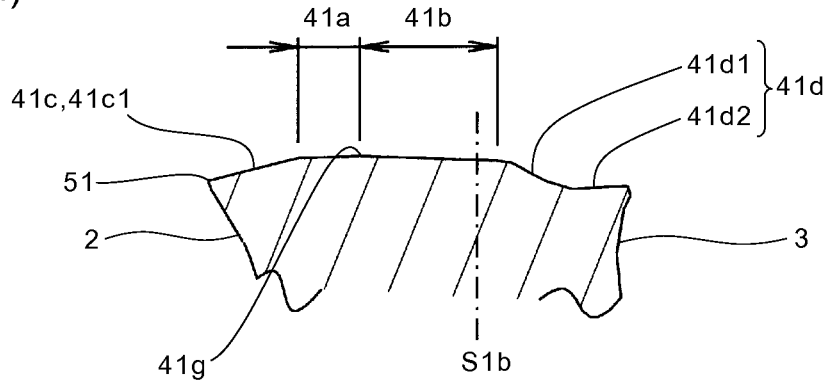
FIG. 6(a) is an enlarged sectional view taken along the line A-A in FIG. 5(a)
Figure 6B:
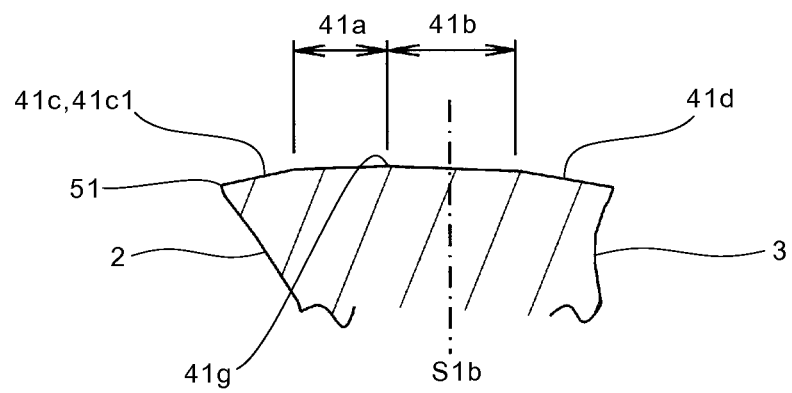
FIG. 6(b) is an enlarged sectional view taken along the line B-B in FIG. 5(a)
Figure 6C:
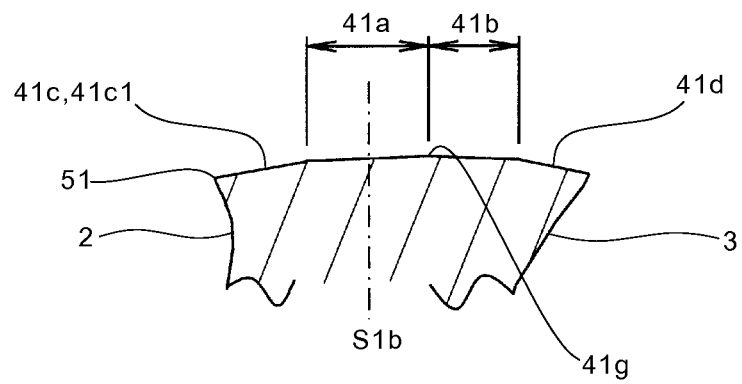
FIG. 6(c) is an enlarged sectional view taken along the line C-C in FIG. 5(a)

Specifically, in the first region located closer to the minor cutting edge 52 (corner cutting edge 53), the first upper reinforcement surface 41c (upper region 41c1) of the first side surface 41 is inclined outward as it goes from the upper surface 2 to the lower surface 3, as shown in FIGS. 6(a) and 6(b). More specifically, the first upper reinforcement surface 41c (upper region 41c1) of the first side surface 41 has a shape that bulges outward as it goes from the upper surface 2 to the lower surface 3. In the present embodiment, a region shown in FIG. 6(c) also has a similar shape.

Figure 6D:
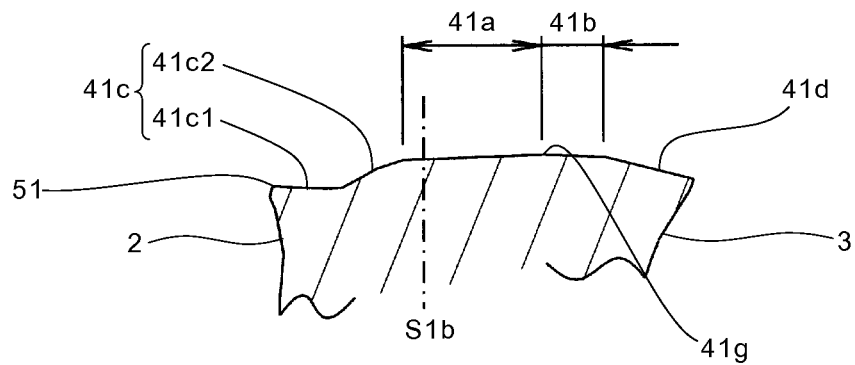
FIG. 6(d) is an enlarged sectional view taken along the line D-D in FIG. 5(a)

On the other hand, in the second region located further away from the minor cutting edge 52 (corner cutting edge 53), the upper region 41c1 of the first upper reinforcement surface 41c, which is continuous with the major cutting edge 51, is inclined inward with respect to the central axis S1 of the insert 1, and the lower region 41c2, which is continuous with a part of the upper region 41c1 located closer to the lower surface 3, is inclined outward as the lower region 41c2 further goes toward the lower surface 3, as shown in FIG. 6(d). More specifically, the lower region 41c2 has a shape that bulges outward as it further goes toward the lower surface 3.

Thus, the upper region 41c1 of the first upper reinforcement surface 41c is inclined inward with respect to the central axis S1 of the insert 1. Therefore, when the insert 1 being attached to the holder 10 is rotated around a rotation axis S2 of the holder 10, a clearance between the upper region 41c1 and the wall surface 101 of the workpiece 100 can be ensured to effectively reduce damage to the wall surface 101 of the workpiece 100. Accordingly, unlike the foregoing first embodiment, a region of the first upper reinforcement surface 41c which bulges outward is small in the region away from the minor cutting edge 52 (corner cutting edge 53) in the present embodiment. In the foregoing point, a similar relationship between the upper region 41d1 and the lower region 41d2 is established in the lower reinforcement surface 41d, as shown in FIG. 6(a). For example, inclination angles of the upper region 41d1 and the lower region 41d2 are respectively determined with reference to the central axis S1 as the first flank surface 41e goes from the upper surface 2 to the lower surface 3.

Unlike the first embodiment, the inclination of a first flank surface 41e of the first side surface 41 from the upper surface 2 to the lower surface 3 with respect to the central axis S1 of the insert 1 is changed from an inward inclination to an outward inclination as the first flank surface 41e separates from the minor cutting edge 52 in the present embodiment.

Similarly to the first embodiment, the second side surface 42 includes a second upper constraining surface 42a and a second lower constraining surface 42b, and has a relationship between an inclination angle $\alpha 1$ and an inclination angle $\alpha 2$, which is given as $\alpha 1=\alpha 2$. For example, the inclination angles $\alpha 1$ and $\alpha 2$ are preferably respectively set at 4 to 8 degrees.

Additionally in the present embodiment, the second side surface 42 further includes a second upper reinforcement surface 42c which is located between the minor cutting edge 52 and the second upper constraining surface 42a, and is substantially parallel to the central axis S1, and a second lower reinforcement surface 42d which is located between the major cutting edge 51A located closer to the lower surface 3 and the second lower constraining surface 42b, and is substantially parallel to the central axis S1, as shown in FIGS. 4(c) and 4(d).

That is, in the present embodiment, the second side surface 42 includes the second upper reinforcement surface 42c, the second upper constraining surface 42a, the second lower constraining surface 42b and the second lower reinforcement surface 42 in order as the second side surface 42 goes from the upper surface 2 to the lower surface 3. Thus, the contact with the workpiece 100 during a cutting process can be reduced by including the second upper reinforcement surface 42a and the second lower constraining surface 42b. Furthermore, the second side surface 42 also has excellent cutting edge strength by including the second upper reinforcement surface 42c and the second lower reinforcement surface 42d which are substantially parallel to the central axis S1.

In a thickness direction of the insert 1A from the upper surface 2 to the lower surface 3, a length of the second upper constraining surface 42a is preferably larger than a length of the second upper reinforcement surface 42c. When the ratio of these two lengths is changed in the width direction of the second side surface 42, the area of the second upper constraining surface 42a is preferably larger than the area of the second upper reinforcement surface 42c. Particularly, from the viewpoint of the attachment stability with respect to the holder 10, the area of the second upper constraining surface 42a is preferably three times or more the area of the second upper reinforcement surface 42c. Other configurations are similar to those in the insert 1 of the foregoing first embodiment, and therefore, their descriptions are omitted.

(Third Embodiment)

An insert according to a third embodiment of the present invention is described in details below with reference to FIGS. 8 and 9. In FIGS. 8 and 9, elements identical to those in FIGS. 1 to 7 are identified by the same reference numerals, and their respective descriptions are omitted. A basic configuration of the insert of the third embodiment is identical to that of the foregoing insert 1A of the second embodiment. Therefore, the following description is focused mainly on differences from the insert of the second embodiment, and descriptions of overlapping contents are omitted here.

Similarly to the insert 1 or 1A according to the first or second embodiment, a major cutting edge 51 and a minor cutting edge 52 are connected to each other with a corner cutting edge 53 interposed therebetween in a cutting edge 5 included in the insert 1B of the present embodiment.

Figure 8A:
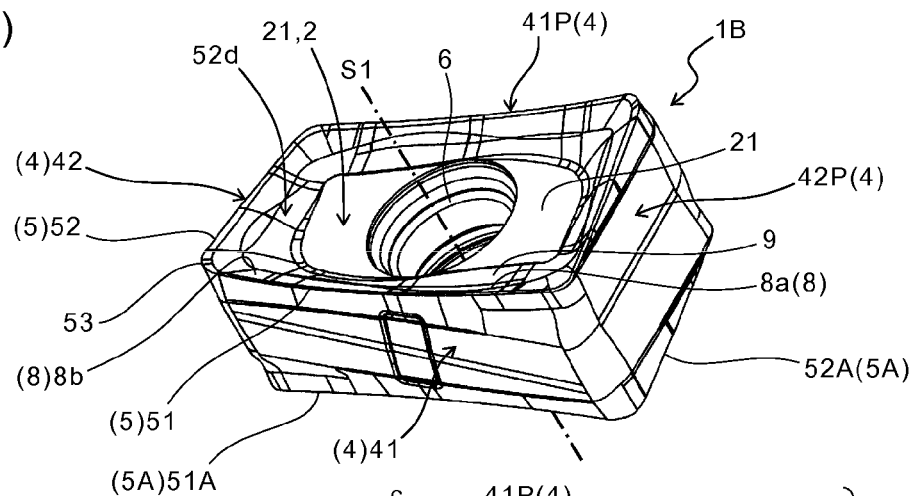
FIG. 8(a) is a perspective view showing a cutting tool according to a third embodiment of the present invention.
Figure 8B:
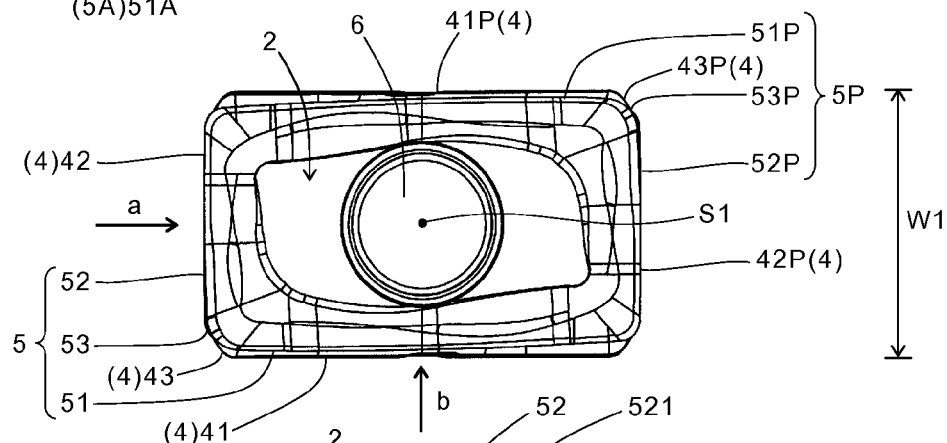
FIG. 8(b) is a plan view (top view) thereof.
Figure 8C:
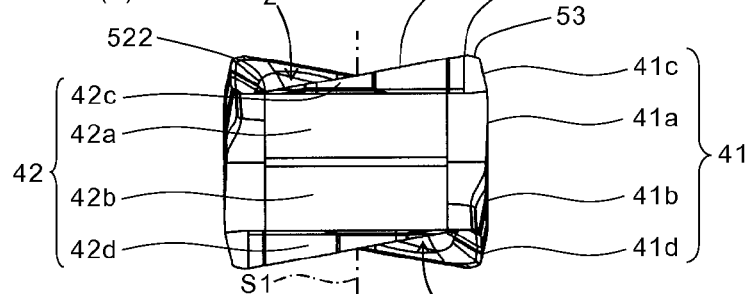
FIG. 8(c) is a side view thereof (the side closer to a second side surface)
Figure 8D:
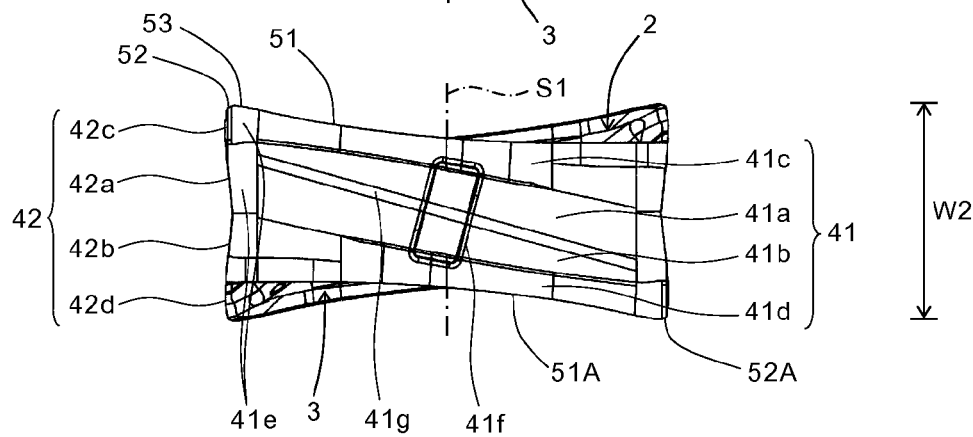
FIG. 8(*d*) is a side view thereof (the side closer to a first side surface)

Unlike the second embodiment, the minor cutting edge 52 in the present embodiment is inclined downward in a straight-like line as the minor cutting edge 52 goes from one end 521 thereof located closer to the major cutting edge 51 (corner cutting edge 53) to the other end 522 thereof away from the major cutting edge 51 (corner cutting edge 53) in a side view from a second side surface 42, as shown in FIG. 8(c). An inclination angle of the minor cutting edge 52 is preferably set at 6 to 13 degrees with reference to a plane perpendicular to a central axis S1 in a side view.

A region of the minor cutting edge 52 located closer to the one end 521 has a major role in smoothing a machined surface 102 of a workpiece 100. Thus, the minor cutting edge 52 is formed with a single straight line. Therefore, compared to the second embodiment, the present embodiment does not include a region protruded from the one end 521 to the other end 522, such as the top point 52T. Consequently, when chips generated during a cutting process using cutting edges 51 to 53 located closer to one corner side surface 43 are discharged through an upper surface 2 (rake surface 8), it is capable of preventing the chips from colliding with a minor cutting edge 52P located closer to the other corner side surface 43P, thereby making it possible to reduce damage to the minor cutting edge 52P not yet used. As another example, the minor cutting edge 52 may be formed into a single gentle arc-like shape in a side view from the second side surface 42.

Similarly to the insert 1 or 1A according to the first or second embodiment, a side surface 4 is connected to each of the upper surface 2 and a lower surface 3, and includes a first side surface 41 and a second side surface 42 adjacent to each other, as shown in FIGS. 8 and 9.

Similarly to the second embodiment, the first side surface 41 includes a first upper reinforcement surface 41c, a first upper constraining surface 41a, a first lower constraining surface 41b and a first lower reinforcement surface 41d as the first side surface 41 goes from the upper surface 2 to the lower surface 3, as shown in FIG. 8. The first side surface 41 also includes a first flank surface 41e, as shown in FIG. 8(d). The first side surface 41 further includes a boundary part 41g between the first upper constraining surface 41a and the first lower constraining surface 41b, and a concave part 41f located at a substantially middle part of each of the first upper constraining surface 41a and the first lower constraining surface 41b.

Unlike the thin straight-like lined boundary part of the second embodiment, the boundary part 41g of the present embodiment is in a band shape having a relatively large width in a thickness direction of the insert 1B, and is also in a gentle curved shape that bulges outward as the boundary part 41g goes from one end to the other end in the width direction thereof. Accordingly, a material can be loaded into a die more smoothly during formation of the insert 1B. A radius of curvature of a curved line is preferably set at, for example, 0.1 to 0.5 mm.

Similarly to the second embodiment, the second side surface 42 includes a second upper reinforcement surface 42c, a second upper constraining surface 42a, a second lower constraining surface 42b and a second lower reinforcement surface 42d in order as the second side surface 42 goes from the upper surface 2 to the lower surface 3, as shown in FIGS. 8(c) and 9. Similarly to the second embodiment, the second side surface 42 has a relationship between an inclination angle $\alpha 1$ and an inclination angle $\alpha 2$, which is given as $\alpha 1=\alpha 2$. For example, the inclination angles $\alpha 1$ and $\alpha 2$ are preferably set at 4 to 8 degrees.

Similarly to the second embodiment, the second side surface 42 further includes a second upper reinforcement surface 42c which is located between the minor cutting edge 52 and the second upper constraining surface 42a, and is substantially parallel to a central axis S1, and a second lower reinforcement surface 42d which is located between the major cutting edge 51A located closer to the lower surface 3 and the second lower constraining surface 42b, and is substantially parallel to the central axis S1, as shown in FIGS. 8(c) and 9. Hence, the insert 1B is capable of producing a similar operation advantage to the second embodiment.

Figure 9A:
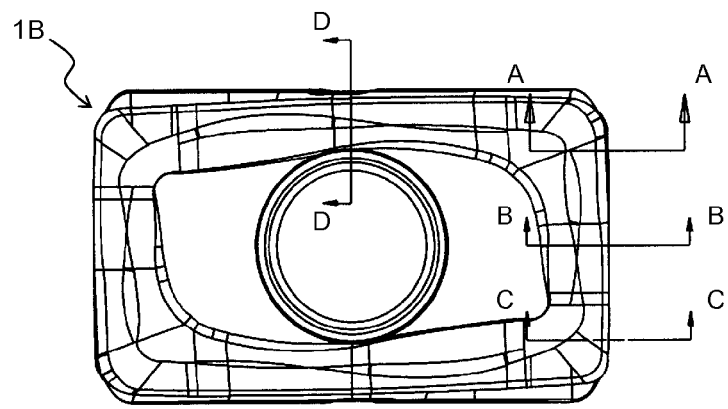
FIG. 9(*a*) is a plan view (top view) showing the cutting insert of FIG. 8.
Figure 9B:
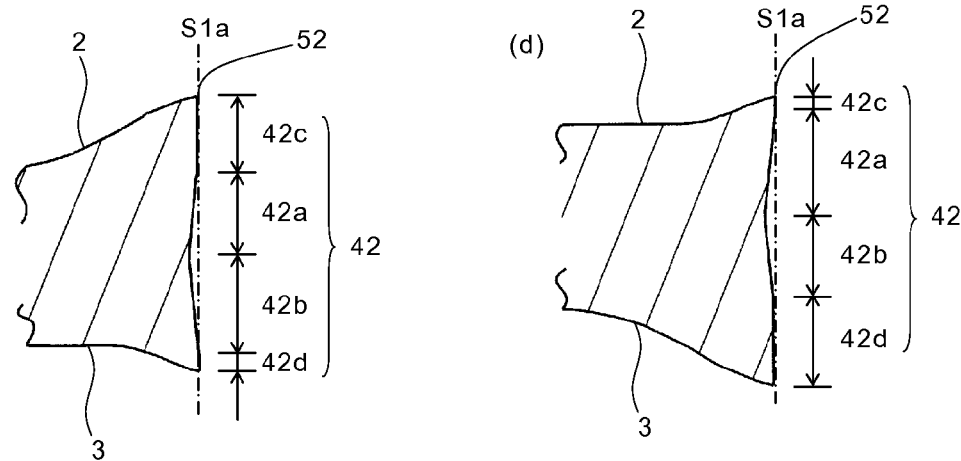
Figure 9C:
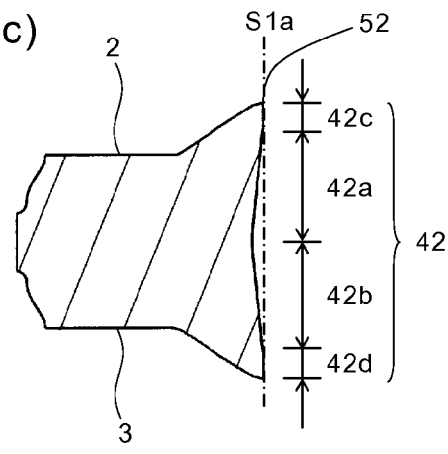
Figure 9C:
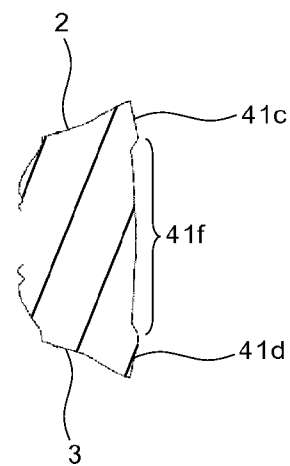

In the present embodiment, according to the straight-like lined inclination of the minor cutting edge 52 as described above, the second upper reinforcement surface 42c and the second lower reinforcement surface 42d have a smaller length in the thickness direction of the insert 1B as they separate from their corresponding major cutting edge 51 (corner cutting edge 53) as shown in FIGS. 9(b) to 9(d). Other configurations are similar to those in the insert 1 or 1A according to the foregoing first or second embodiment, and their descriptions are omitted here.

<Cutting Tool>

Next, a cutting tool according to an embodiment of the present invention is described with reference to FIGS. 10 to 12. In the present embodiment, the cutting tool employs the insert 1 according to the first embodiment among the inserts according to the first to third embodiments. The cutting tool with the insert 1 attached thereto is described as an example.

Figure 11A:
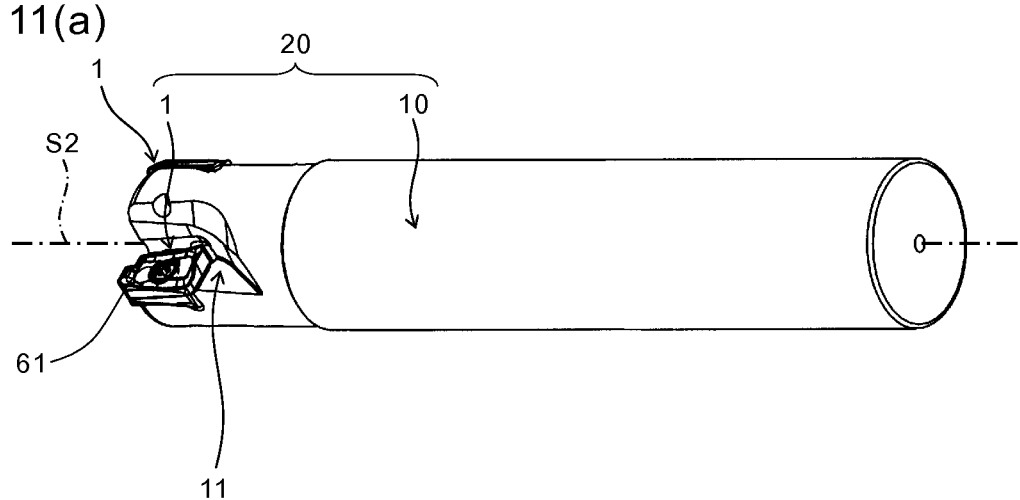
FIG. 11(*a*) is a perspective view showing a cutting tool according to an embodiment of the present invention.
Figure 11B:
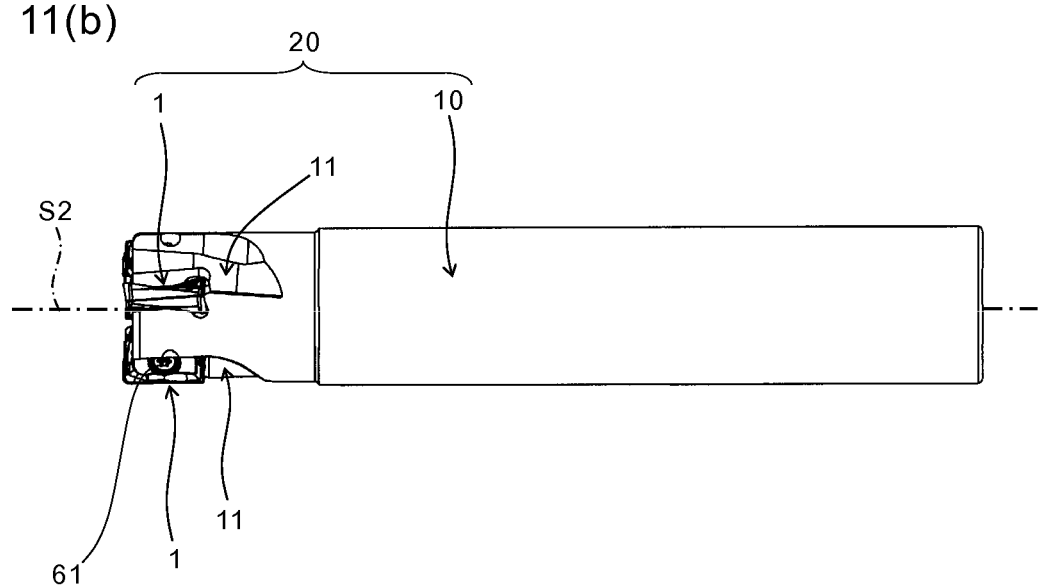

The cutting tool 20 of the present embodiment is configured to attach a plurality of the inserts 1 to peripheral front end portions of the holder 10, as shown in FIGS. 11 and 12.

Figure 10A:
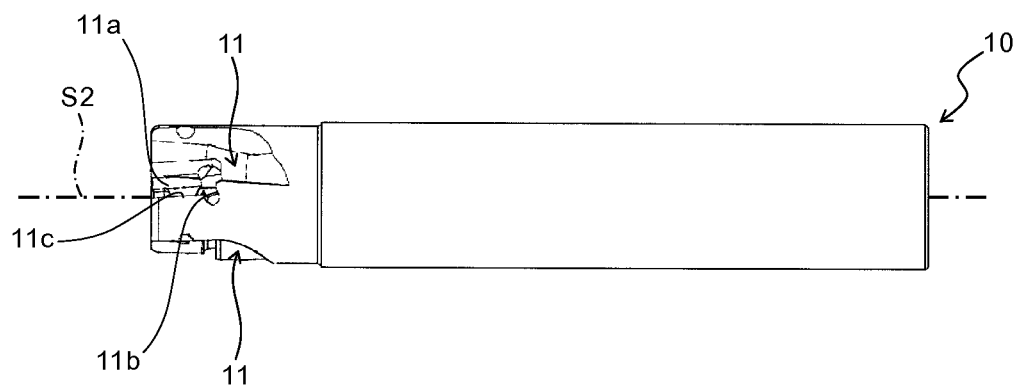
FIG. 10(*a*) is a side view showing a holder configured to attach thereto the cutting inserts according to the embodiments of the present invention.
Figure 10B:
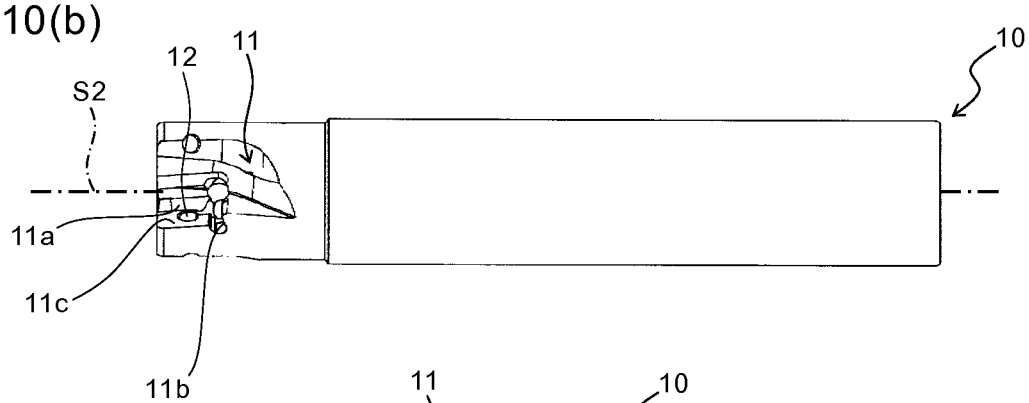
Figure 10C:
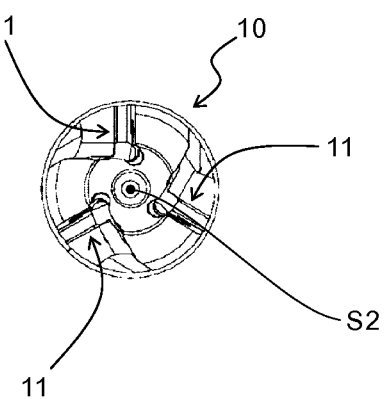

To be specific, as shown in FIG. 10, the holder 10 has, at the peripheral front end portions thereof, a plurality of insert pockets 11 spaced apart from each other in a circumferential direction. As shown in FIG. 10(c), these insert pockets 11 are portions obtained by cutting out the peripheral front end portions of the holder 10 into a substantially V-shape in a front end view. A plurality of attachment surfaces formed by the cut-out process function as attachment portions for the inserts 1. These inserts 1 are respectively attached to these insert pockets 11 one by one.

Figure 12A:
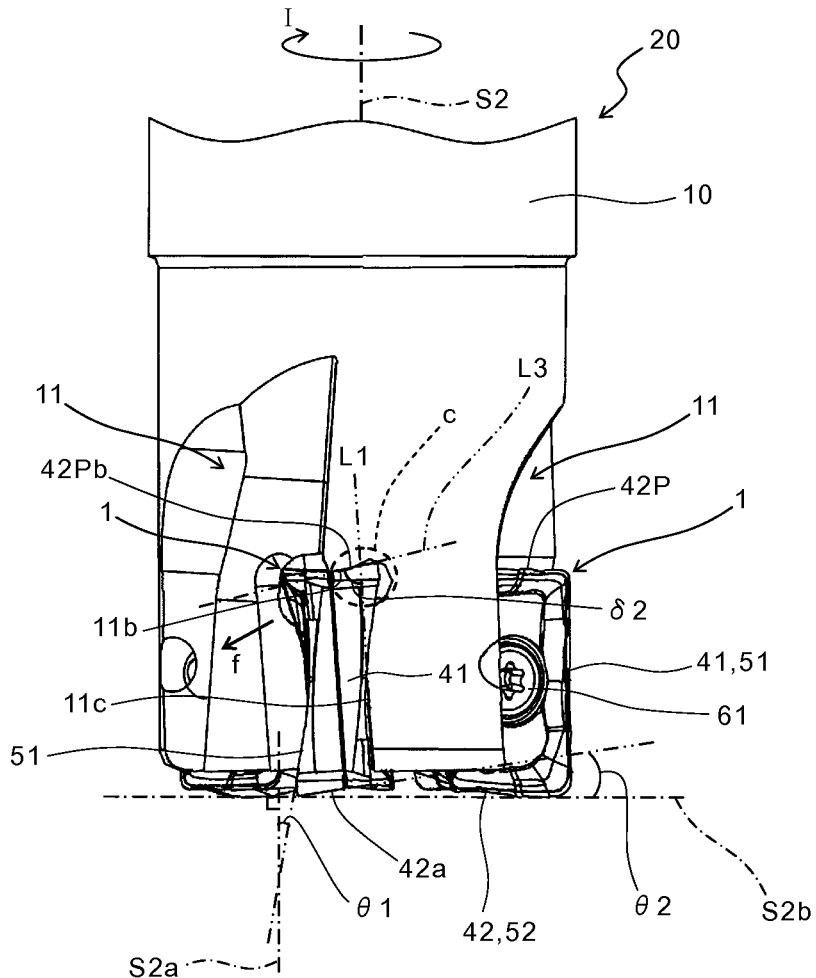
FIG. 12(*a*) is a partially enlarged view showing in enlarged dimension a front end part of the cutting tool of FIG. 11(*b*)

A method of attaching the inserts 1 includes, for example, inserting a fastening screw 61 into the through hole 6 of the insert 1; and screwing the front end of the fastening screw 61 into a screw hole 12 formed in the attachment surface of the holder 10 (refer to FIGS. 10(b), 11 and 12(a)). As another method of attaching the inserts 1, for example, a clamp structure may be employed.

Figure 12B:
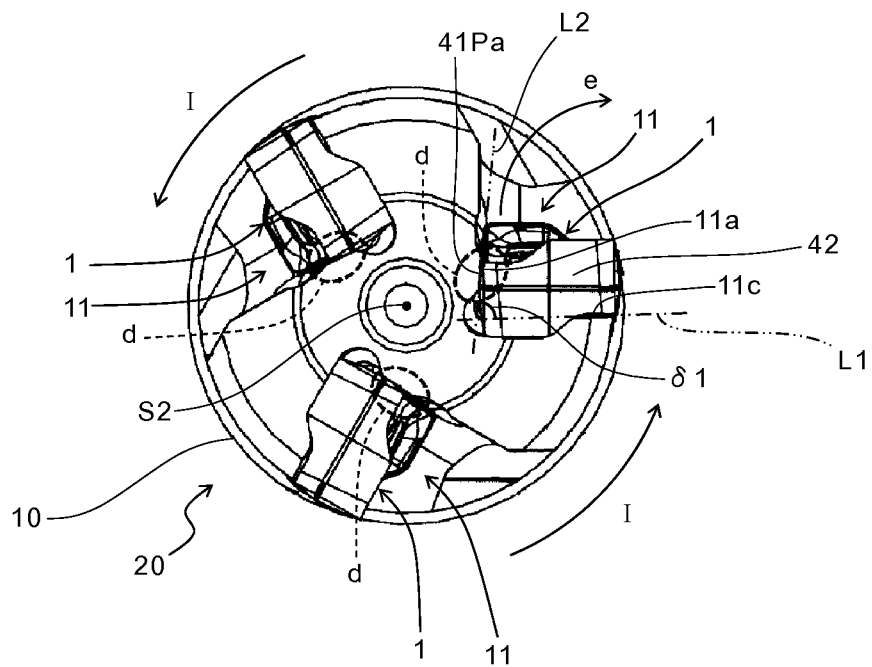

As shown in FIGS. 10 and 12(b), the holder 10 (insert pocket) includes a seating surface 11c configured to contact the lower surface 3 of the insert 1, and a first constraining surface 11a (contact surface) configured to contact the first upper constraining surface 41a (third upper constraining surface 41Pa) of the insert 1. An angle δ1 formed by a virtual extension line L7 of the seating surface 11c and a virtual extension line L8 of the first constraining surface 11a is an acute angle.

As shown in FIG. 10 and FIG. 12(a), the holder 10 (insert pocket) further includes a second constraining surface 11b (contact surface) configured to contact the second lower constraining surface 42b (fourth lower constraining surface 42Pb) of the insert 1. An angle δ2 formed by the virtual extension line L7 of the seating surface 11c and a virtual extension line L9 of the second constraining surface 11b is an acute angle.

The insert 1 is attached to the holder 10 in a state in which the upper surface 2 is oriented forward in the rotation direction as indicated by an arrow I in FIG. 12, and the major cutting edge 51 protrudes beyond the periphery of the holder 10. With the first side surface 41 and the second side surface 42 located closer to the periphery of the front end of the holder 10, the cutting process of the workpiece 100 is performed using the upper major cutting edge 51 and the minor cutting edge 52.

At this time, some of the side surface 4 of the insert 1 which do not contribute to a cutting action, namely, the third side surface 41P and the fourth side surface 42P are respectively contacted with the contact surfaces of the holder 10. That is, as indicated by a region surrounded by a broken line c in FIG. 12(a), the fourth lower constraining surface 42Pb of the fourth side surface 42P is contacted with the second constraining surface 11b of the holder 10. As shown by a region surrounded by a broken line d in FIG. 12(b), the third upper constraining surface 41Pa of the third side surface 41P is contacted with the first constraining surface 11a of the holder 10. Thus, the insert 1 and the holder 10 are constrained with each other, thereby establishing the attachment of the insert 1 to the holder 10.

According to the cutting tool 20 of the present embodiment, as shown in FIG. 12(b), a relative large cutting force exerted on the major cutting edge 51 located closer to the first side surface 41 acts as a force (buoyancy) by which the third side surface 41P of the insert 1 is lifted up from the holder 10 in a direction of arrow f via the fastening screw 61 inserted into the through hole 6. However, owing to the feature that the angle of the angle δ1 is the acute angle, the third upper constraining surface 41Pa of the third side surface 41P subjected to the buoyancy can be pressed down from above by the first constraining surface 11a of the holder 10, thereby effectively constraining the insert 1.

Further, as shown in FIG. 12(a), a relatively small cutting force exerted on the minor cutting edge 52 located closer to the second side surface 42 acts as a force (buoyancy) by which the fourth side surface 42P of the insert 1 is lifted up from the holder 10 in the direction of arrow f via the fastening screw 61 inserted into the through hole 6. However, owing to the feature that the angle of the angle δ2 is the acute angle, the fourth lower constraining surface 42Pb of the fourth side surface 42P subjected to the buoyancy can be pressed down from above by the second constraining surface 11b of the holder 10, thereby effectively constraining the insert 1. Thus, according to the cutting tool 20 of the present embodiment, appropriate constraining forces can be generated depending on the position subjected to the cutting force, and the magnitude of the cutting force, thereby improving the constraining stability between the insert 1 and the holder 10.

Additionally, the cutting tool 20 of the present embodiment can improve the degree of freedom for the attachment of the insert 1 to the holder 10, and can provide an excellent operation advantages obtained therefrom. That is, as shown in FIG. 12 (a), the major cutting edge 51 is disposed to have a positive axial rake angle θ1. This reduces cutting resistance. The second upper constraining surface 42a of the second side surface 42 is disposed to have a flank angle θ2 of approximately 8 to 15 degrees. This reduces damage to the second upper constraining surface 42a, and also improves the surface roughness of the machined surface 102 of the workpiece 100.

The axial rake angle θ1 of the major cutting edge 51 is preferably set at approximately 8 to 15 degrees at the end portion thereof located closer to the minor cutting edge 52, and the axial rake angle θ1 is preferably decreased as it separates from the minor cutting edge 52. Here at, the axial rake angle θ1 denotes an inclination angle with respect to a plane S2a parallel to a rotation axis S2 of the holder 10, and the flank angle $θ_2$ denotes an inclination angle with respect to a plane S2b perpendicular to the central axis S2 of the holder 10.

In the present embodiment, the insert 1 is arranged so that the longitudinal direction thereof is inclined at approximately 2 to 6 degrees with respect to the rotation axis S2 of the holder 10 in a side view. Accordingly, the minor cutting edge 52 is arranged to be inclined at approximately 0 to 1 degree with respect to the plane S2b perpendicular to the rotation axis S2 of the holder 10. A non-cutting region that is not substantially used as the minor cutting edge 52 in the intersection of the upper surface 2 and the second side surface 42, namely, a region from a middle part of the intersection to an end portion thereof opposite the corner cutting edge 53 is preferably arranged to have an inclination of approximately 0 to 2 degrees with respect to the plane S2b perpendicular to the rotation axis S2 of the holder 10. With this arrangement, the non-cutting region is separated from the machined surface 102 of the workpiece 100 during the cutting process, and hence, their mutual contact can be prevented to reduce damage to the non-cutting region. That is, when the insert 1 is used by revering the upper surface 2 and the lower surface 3, the non-cutting region located closer to the upper surface 2 can appropriately perform the function as the minor cutting edge 52. This is also true for the case where the upper and lower surfaces are reversed.

The cutting of the workpiece 100 by the upper major cutting edge 51 and the minor cutting edge 52 is carried out by rotating the cutting tool 20 having the foregoing configurations in a direction of arrow I around the rotation axis S2 of the holder 10.

<Method of Manufacturing Machined Product>

Next, a method of manufacturing a machined product according to an embodiment of the present invention is described below with reference to FIG. 13. In the present embodiment, the description is made by taking the foregoing cutting 20 as an example.

The cutting tool 20 having the plurality of cutting inserts 1 attached to the holder 10 in the foregoing manner is prepared before starting the cutting process of the workpiece 100. As shown in FIG. 13, the cutting tool 20 is arranged so that the rotation axis S2 of the holder 10 is substantially parallel to a surface of the workpiece 100 which is cut into a wall surface 101.

Figure 13A:
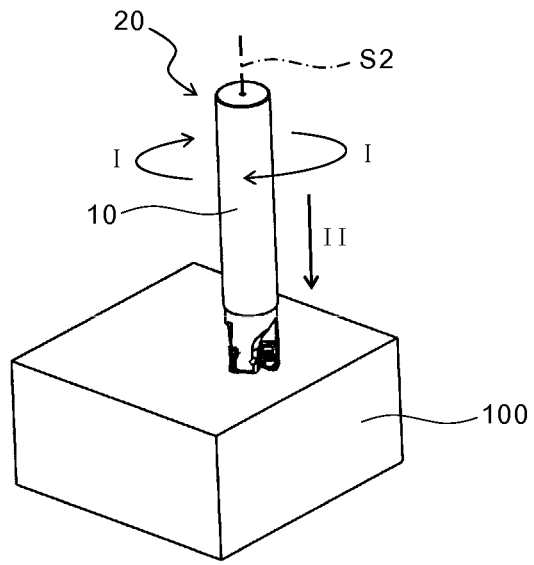
FIGS. 13(*a*) to 13(*c*) are perspective views showing a method of manufacturing a machined product according to an embodiment of the present invention in manufacturing step order.

Subsequently, as shown in FIG. 13(a), an appropriate depth of cut is set by fixing the workpiece 100 to a bed or the like of a milling machine (not shown), and by moving the cutting tool 20 in a direction of arrow II.

Figure 13B:
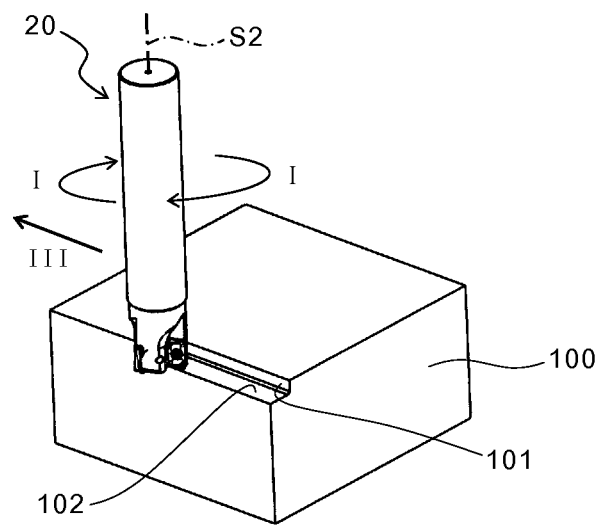

Subsequently, as shown in FIG. 13(b), the cutting tool 20 is fed (moved) in a direction of arrow III while rotating the cutting tool 20 in a direction of arrow I around the rotation axis S2 of the holder 10. Thereby, the major cutting edge 51 is contacted against an arc-like portion of the workpiece 100 located ahead in the feed direction so as to cut a region according to the depth of cut. At that time, an arc-like line (cutting trace) remains on the surface (bottom surface) of the workpiece 100 because the plurality of inserts 1 enter the cutting region and perform cutting in order. The arc-like line is cut by the minor cutting edge 52, thus producing a smooth surface.

Figure 13C:
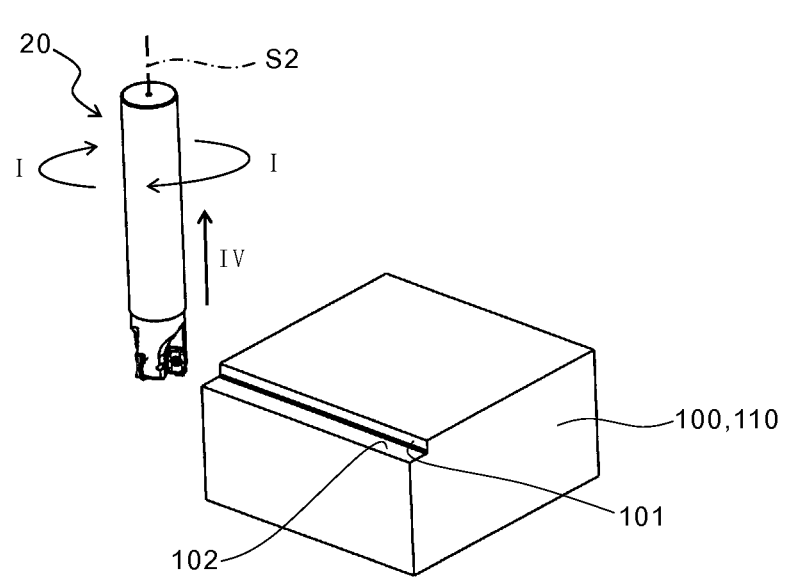

Subsequently, as shown in FIG. 13(c), the cutting tool 20 is separated from the workpiece 100 by pulling up the cutting tool 20 in a direction of arrow IV after the cutting tool 20 passes through the workpiece 100.

A machined product 110 having the wall surface 101 and the machined surface 102 is manufactured through the foregoing manufacturing steps. That is, in the method of manufacturing the machined product according to the present embodiment, the machined product 110 is manufactured by sequentially performing the step of cutting the workpiece 100 by bringing the individual inserts 1 into contact against the workpiece 100 by rotating the cutting tool 20; and the step of separating the cutting tool 20 from the workpiece 100.

When the cutting process is continuously performed, it is required to repeat the foregoing steps, as shown in FIGS. 13(b) and 13(c), by bringing the cutting edge 5 of the cutting tool 20 into contact against the same portion or different portions of the workpiece 100, while holding the rotation of the cutting tool 20.

When the cutting edge 5 being used is worn, the cutting may be performed using other cutting edge 5 or 5P not yet used by rotating the insert 1 around the central axis S1, or by reversing the upper surface 2 and the lower surface 3.

It is to be understood that the present invention is not limited to the foregoing embodiments, and various changes and modifications can be made therein without departing from the spirit or scope of the present invention.

For example, the inserts 1, 1A and 1B according to the foregoing first to third embodiments may be changed to permit their mutual application in a possible range in order to allow the individual elements of the inserts to exhibit their respective functions.

In the foregoing embodiment, the cutting tool 20 being rotated is fed to the workpiece 100. Alternatively, the cutting process may be performed by rotating the cutting tool 20 at a predetermined position, and by subjecting the workpiece 100 to feed-travel with respect to the cutting tool 20. Instead of the milling machine exemplified as a tool machine in the foregoing embodiment, the cutting process may be performed by bringing the cutting tool 20 not being rotated and the workpiece 100 being rotated into contact with each other as in the case of a lathe.

Although the foregoing embodiments have described the cutting tool having the inserts 1 according to the first embodiment attached thereto, and the method of manufacturing the machined product by using the cutting tool, a similar effect can be produced when the insert 1A or 1B according to the second or third embodiment is used instead of the insert 1 according to the first embodiment.

Particularly, in the application of the insert 1A or 1B according to the second or third embodiment, when the first constraining surface 11a of the holder 10 has the planar shape, the two surfaces (regions) 41a1 and 41a2 of the first upper constraining surface 41a which are divided by the concave part 41f are contacted with the first constraining surface 11a. Therefore, the insert 1A or 1B according to the second or third embodiment can ensure a relatively large contact area with the holder 10 even if a slight dislocation occurs when the insert 1A or 1B is attached to the holder 10. This produces the effect of improving the attachment stability with respect to the holder 10.

The invention claimed is:

1. A cutting insert, comprising:
   an upper surface;
   a lower surface;
   a side surface which is connected to each of the upper surface and the lower surface, and comprises a first side surface and a second side surface adjacent to each other; and
   a cutting edge comprising a major cutting edge located at an intersection of the upper surface and the first side surface, and a minor cutting edge located at an intersection of the upper surface and the second side surface, wherein
   the upper surface comprises a rake surface which is located along the major cutting edge and is inclined downward as the upper surface separates from the major cutting edge, and
   the second side surface comprises a second upper constraining surface and a second lower constraining surface in order as the second side surface goes from the upper surface to the lower surface, wherein the second upper constraining surface is inclined inward at an inclination angle $\alpha 1$ with reference to a central axis extending between the upper surface and the lower surface, and the second lower constraining surface is continuous with the second upper constraining surface and is inclined outward at an inclination angle $\alpha 2$ with reference to the central axis.

2. The cutting insert according to claim 1, wherein the cutting insert has a rectangular shape comprising long sides correspond to an outer edge located closer to the first side surface and short sides correspond to an outer edge located closer to the second side surface in a top view.

3. The cutting insert according to claim 1, wherein
the first side surface comprises a first upper constraining surface and a first lower constraining surface in order as the first side surface goes from the upper surface to the lower surface,
the first upper constraining surface is inclined outward at an inclination angle $\beta 1$ with reference to the central axis, and
the first lower constraining surface is continuous with the first upper constraining surface and is inclined inward at an inclination angle $\beta 2$ with reference to the central axis.

4. The cutting insert according to claim 3, wherein
the first side surface further comprises a first upper reinforcement surface which is located between the major cutting edge and the first upper constraining surface, and has a region inclined outward at an inclination angle $\beta 3$ with reference to the central axis as the first side surface goes from the upper surface to the lower surface, and
the inclination angle $\beta 3$ of the first upper reinforcement surface is larger than the inclination angle $\beta 1$ of the first upper constraining surface.

5. The cutting insert according to claim 4, wherein
the first upper reinforcement surface further comprises an upper region continuous with the major cutting edge,
the upper region comprises a first region located closer to the minor cutting edge, and a second region located further away from the minor cutting edge in a side view, and
the first region is inclined outward and the second region is inclined inward, as the upper region goes toward the lower surface.

6. The cutting insert according to claim 5, wherein
the first upper reinforcement surface further comprises a lower region continuous with a part of the upper region closer to the lower surface, and
the lower region is inclined outward in the second region as the lower region goes toward the lower surface.

7. The cutting insert according to claim 3, wherein the first side surface further comprises a boundary part located at a position where the first upper constraining surface and the first lower constraining surface intersect with each other.

8. The cutting insert according to claim 7, wherein the boundary part is in a straight-like line.

9. The cutting insert according to claim 8, wherein the boundary part is in a band shape having a predetermined width in a thickness direction, and is in a curved shape that bulges outward as the boundary part goes from one end to the other end in a width direction, in a side view.

10. The cutting insert according to claim 3, wherein
the first side surface further comprises a concave part which extends from a side of the upper surface to a side of the lower surface, and is located in at least one of the first upper constraining surface and the first lower constraining surface, and
the at least one of the first upper constraining surface and the first lower constraining surface is divided into two regions by the concave part.

11. The cutting insert according to claim 4, wherein
the first side surface further comprises a first flank surface which is continuous with the major cutting edge, is located closer to the second side surface than both the first upper reinforcement surface and the first upper constraining surface, and is inclined outward at an inclination angle $\gamma$ with reference to the central axis as the first side surface goes from the upper surface to the lower surface, and
the inclination angle $\gamma$ of the first flank surface is smaller than the inclination angle $\beta 3$ of the first upper reinforcement surface.

12. The cutting insert according to claim 1, wherein the second side surface further comprises a second upper reinforcement surface being located between the minor cutting edge and the second upper constraining surface and being parallel to the central axis.

13. The cutting insert according to claim 1, wherein the minor cutting edge is inclined downward in a straight-like line as the minor cutting edge separates from a side of the major cutting edge in a side view.

14. The cutting insert according to claim 1, wherein the minor cutting edge has a top in a middle region thereof and is inclined downward as the minor cutting edge goes from the top toward a side of the major cutting edge in a side view.

15. The cutting insert according to claim 14, wherein an inclination of the minor cutting edge toward the lower surface is in an arc-like shape protruding toward the upper surface in a side view.

16. The cutting insert according to claim 1, wherein the upper surface further comprises a raised surface which is located continuously with at least a part of the rake surface, and is inclined upward as the upper surface separates from the major cutting edge.

17. The cutting insert according to claim 16, wherein
the upper surface further comprises a flat surface perpendicular to the central axis which is located at an area surrounding the central axis and is spaced apart from the major cutting edge, and
a first end part of the rake surface located further away from the minor cutting edge is continuous with the flat surface with the raised surface interposed therebetween.

18. The cutting insert according to claim 1, wherein
the upper surface further comprises a flat surface perpendicular to the central axis which is located at an area surrounding the central axis and is spaced apart from the major cutting edge, and
a second end part of the rake surface located closer to the minor cutting edge is continuous with the flat surface.

19. The cutting insert according to claim 1, further comprising:
a through hole extending between the upper surface and the lower surface.

20. A cutting tool, comprising:
a cutting insert according to claim 1; and
a holder configured to attach the cutting insert thereto, wherein
the holder comprises a seating surface configured to contact the lower surface of the cutting insert, and a first constraining surface configured to contact the first upper constraining surface of the cutting insert, and an angle formed by a virtual extension line of the seating surface and a virtual extension line of the first constraining surface is an acute angle.

21. The cutting tool according to claim 20, wherein
the holder further comprises a second constraining surface configured to contact the second lower constraining surface of the cutting insert, and
an angle formed by the virtual extension line of the seating surface and a virtual extension line of the second constraining surface is an acute angle.

22. The cutting tool according to claim 20, wherein
the first constraining surface of the holder is in a planar shape, and
a region of the first upper constraining surface which is divided into two by the concave part, and the first constraining surface are contacted with each other.

23. A method of manufacturing a machined product, comprising:
rotating a cutting tool according to claim 20;
bringing the cutting edge of the cutting tool being rotated into contact against a workpiece; and
separating the cutting tool and the workpiece.

* * * * *